(12) United States Patent
Ikeda et al.

(10) Patent No.: US 11,528,429 B2
(45) Date of Patent: Dec. 13, 2022

(54) IMAGE PROCESSING DEVICE, AND IMAGE PROCESSING METHOD

(71) Applicant: SONY CORPORATION, Tokyo (JP)

(72) Inventors: Nobuho Ikeda, Tokyo (JP); Hiroshi Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,783

(22) PCT Filed: Jul. 31, 2019

(86) PCT No.: PCT/JP2019/030088
§ 371 (c)(1),
(2) Date: Mar. 3, 2021

(87) PCT Pub. No.: WO2020/054241
PCT Pub. Date: Mar. 19, 2020

(65) Prior Publication Data
US 2021/0352221 A1    Nov. 11, 2021

(30) Foreign Application Priority Data
Sep. 12, 2018   (JP) .............................. JP2018-170177

(51) Int. Cl.
*G06V 10/22* (2022.01)
*H04N 5/262* (2006.01)
*G06V 40/16* (2022.01)
*H04N 5/268* (2006.01)

(52) U.S. Cl.
CPC ............ *H04N 5/2628* (2013.01); *G06V 10/22* (2022.01); *G06V 40/161* (2022.01); *H04N 5/268* (2013.01)

(58) Field of Classification Search
CPC ...... G06V 10/25; G06V 40/161; G06V 10/22; H04N 5/268; H04N 5/3454
See application file for complete search history.

(56) References Cited

U.S. PATENT DOCUMENTS

| 11,232,294 | B1 * | 1/2022 | Banerjee | G06V 40/10 |
| 2002/0191861 | A1 * | 12/2002 | Cheatle | G06V 10/28 382/175 |
| 2013/0127915 | A1 * | 5/2013 | Gilra | G09G 5/14 345/660 |
| 2014/0176612 | A1 * | 6/2014 | Tamura | G06T 11/60 345/660 |

(Continued)

FOREIGN PATENT DOCUMENTS

| CN | 103905700 A | 7/2014 |
| CN | 107408300 A | 11/2017 |

(Continued)

OTHER PUBLICATIONS

International Search Report and Written Opinion of PCT Application No. PCT/JP2019/030088, dated Oct. 8, 2019, 09 pages of ISRWO.

*Primary Examiner* — Sam Bhattacharya
(74) *Attorney, Agent, or Firm* — Chip Law Group

(57) ABSTRACT

An image processing device includes an evaluation unit configured to evaluate whether a first region of a captured image satisfies a quality condition, and a composition frame setting unit configured to set a different composition frame in the captured image in accordance with an evaluation result of the first region.

19 Claims, 22 Drawing Sheets

(56) References Cited

U.S. PATENT DOCUMENTS

| | | | |
|---|---|---|---|
| 2015/0350490 A1* | 12/2015 | Shimahashi | H04N 1/047 |
| | | | 358/450 |
| 2017/0076434 A1* | 3/2017 | Pyo | G06T 7/13 |
| 2017/0372485 A1 | 12/2017 | Tsunashima | |
| 2018/0005035 A1* | 1/2018 | Bogolea | G06V 20/20 |

FOREIGN PATENT DOCUMENTS

| | | |
|---|---|---|
| JP | 2006-309661 A | 11/2006 |
| JP | 2009-177431 A | 8/2009 |
| JP | 2011-120076 A | 6/2011 |
| JP | 2011-249873 A | 12/2011 |
| JP | 2014-143673 A | 8/2014 |
| JP | 2016-201756 A | 12/2016 |
| WO | 2016/166950 A | 10/2016 |

\* cited by examiner

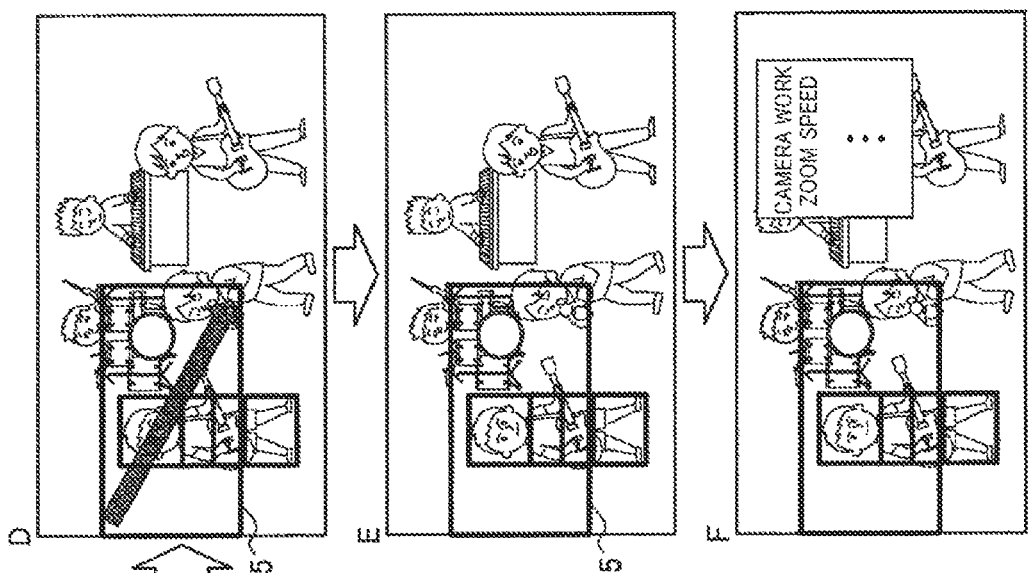
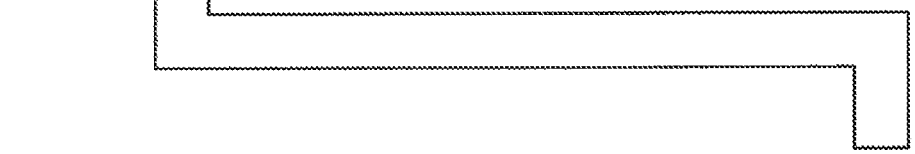
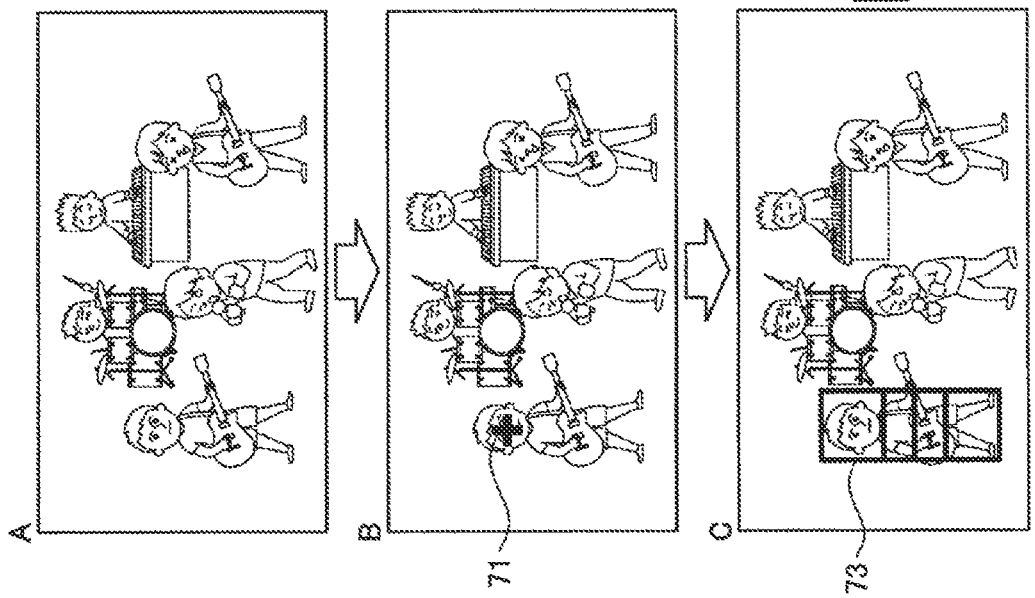

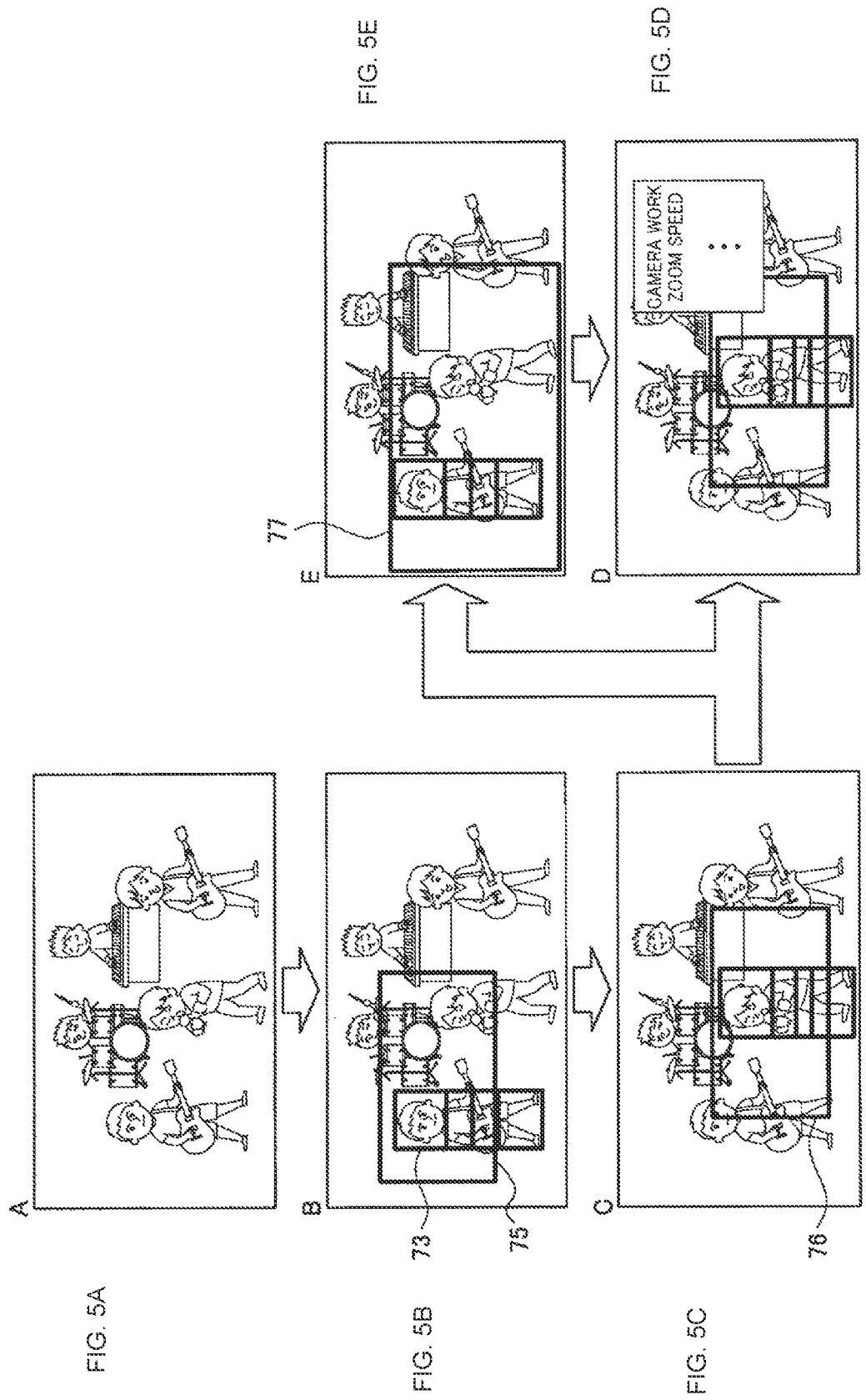

FIG. 6A
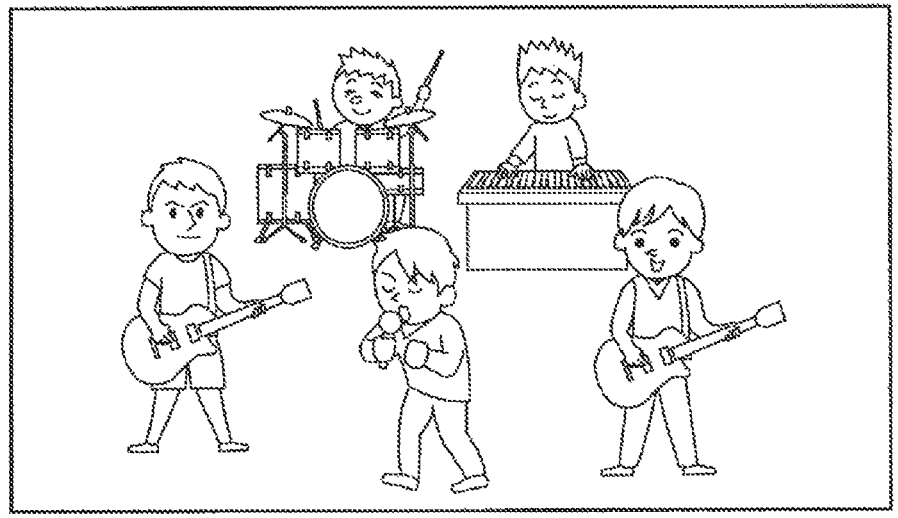
FIG. 6B    78
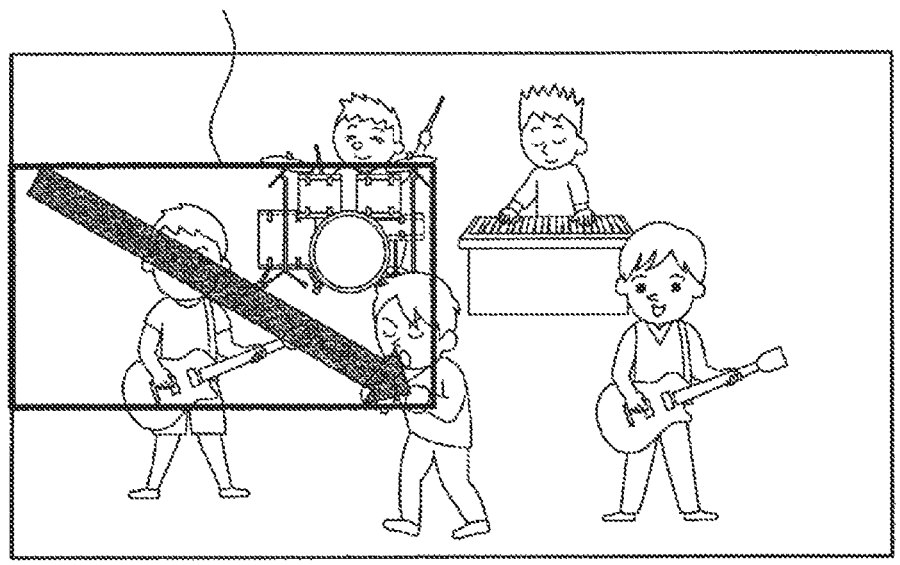

OK

NG

NG

OK

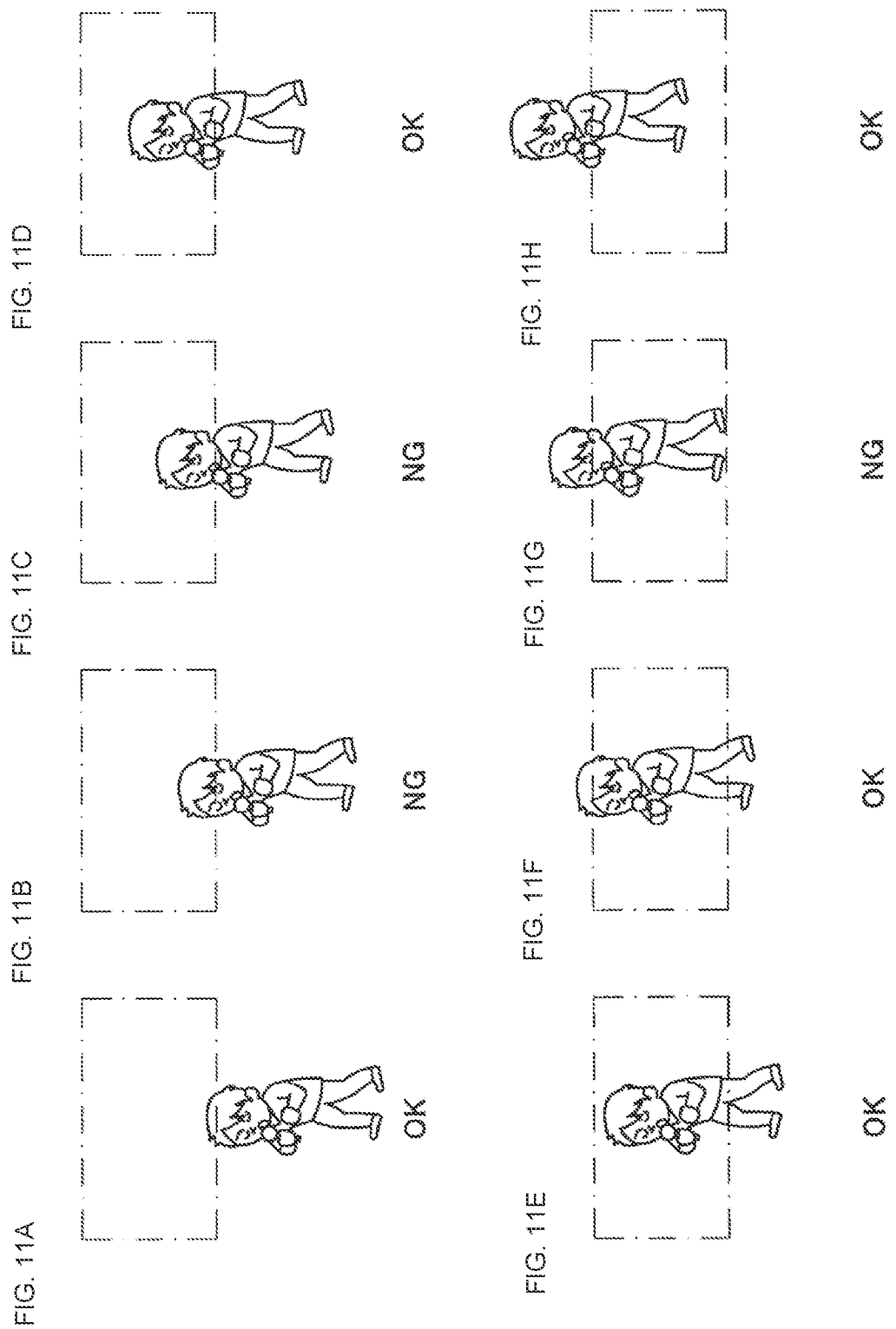

NG

NG

OK

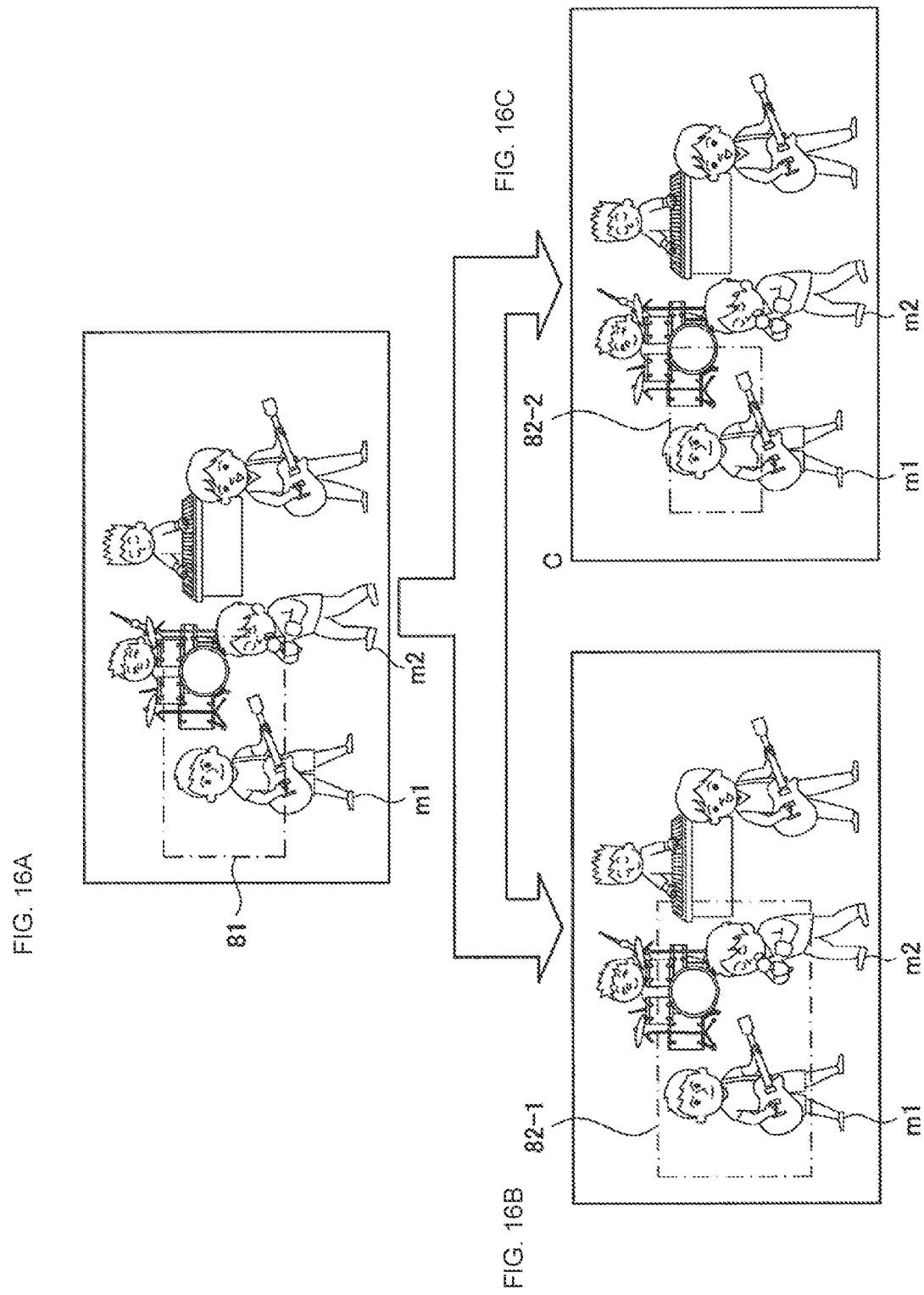

FIG. 17A
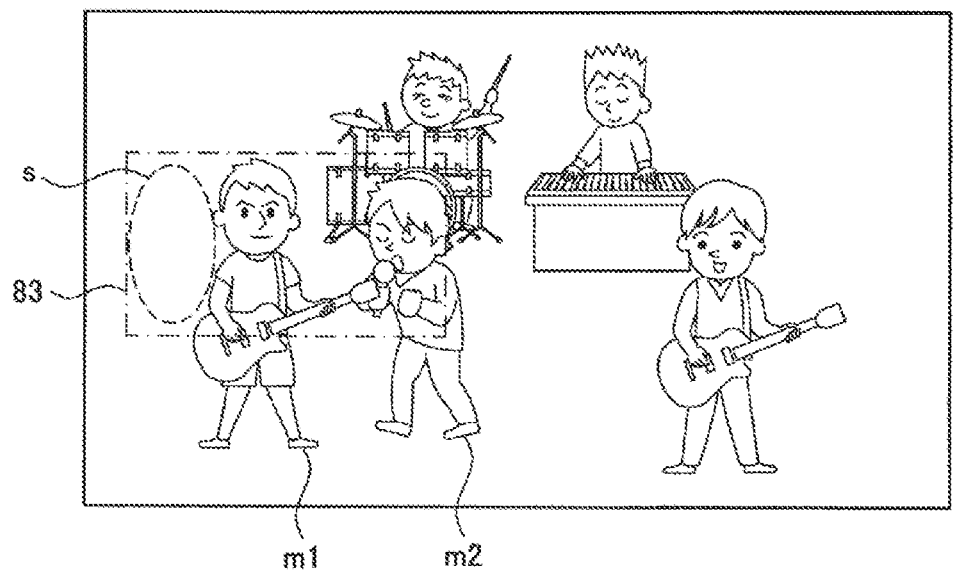
FIG. 17B
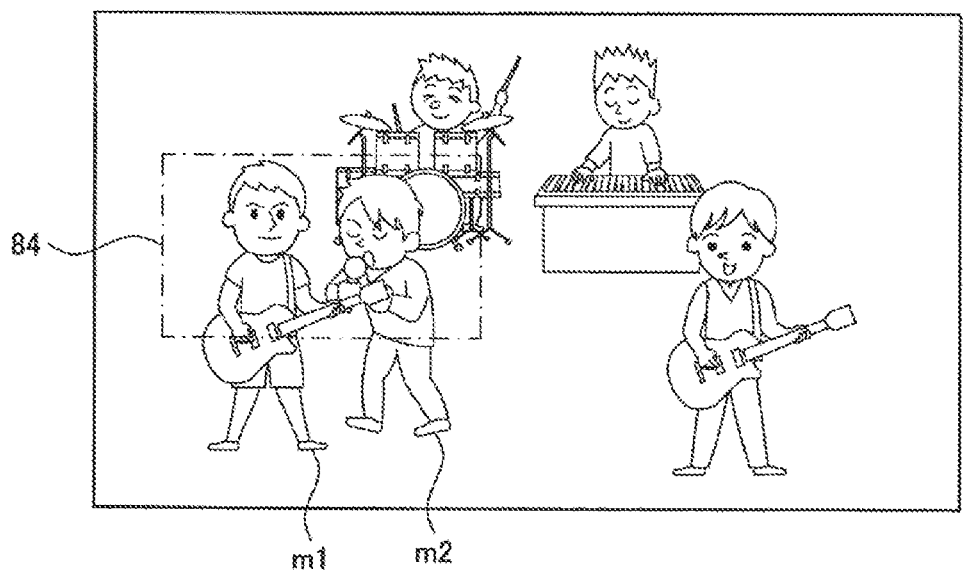

FIG. 18A
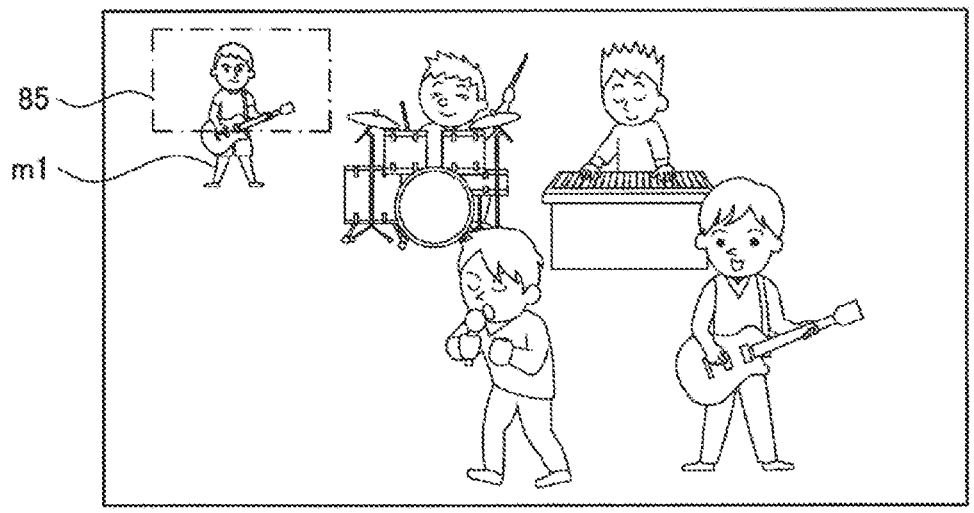
FIG. 18B
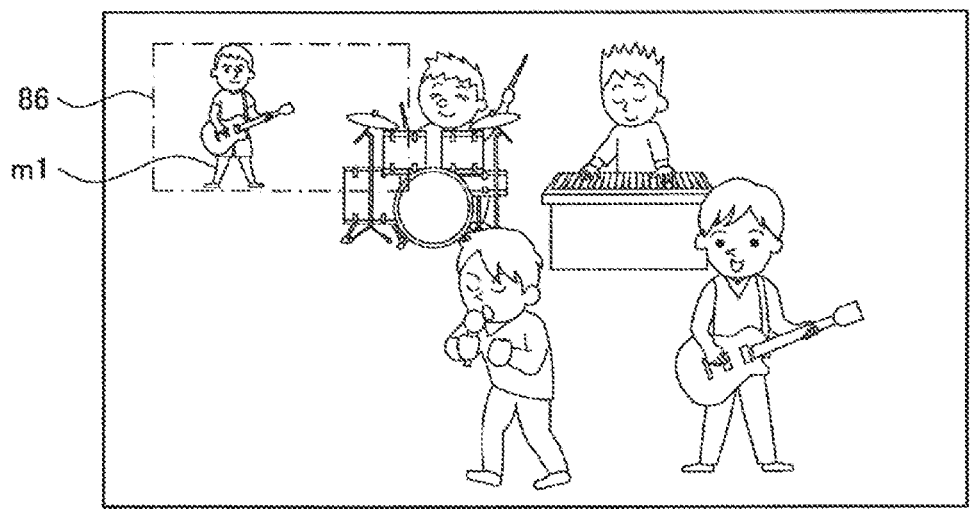

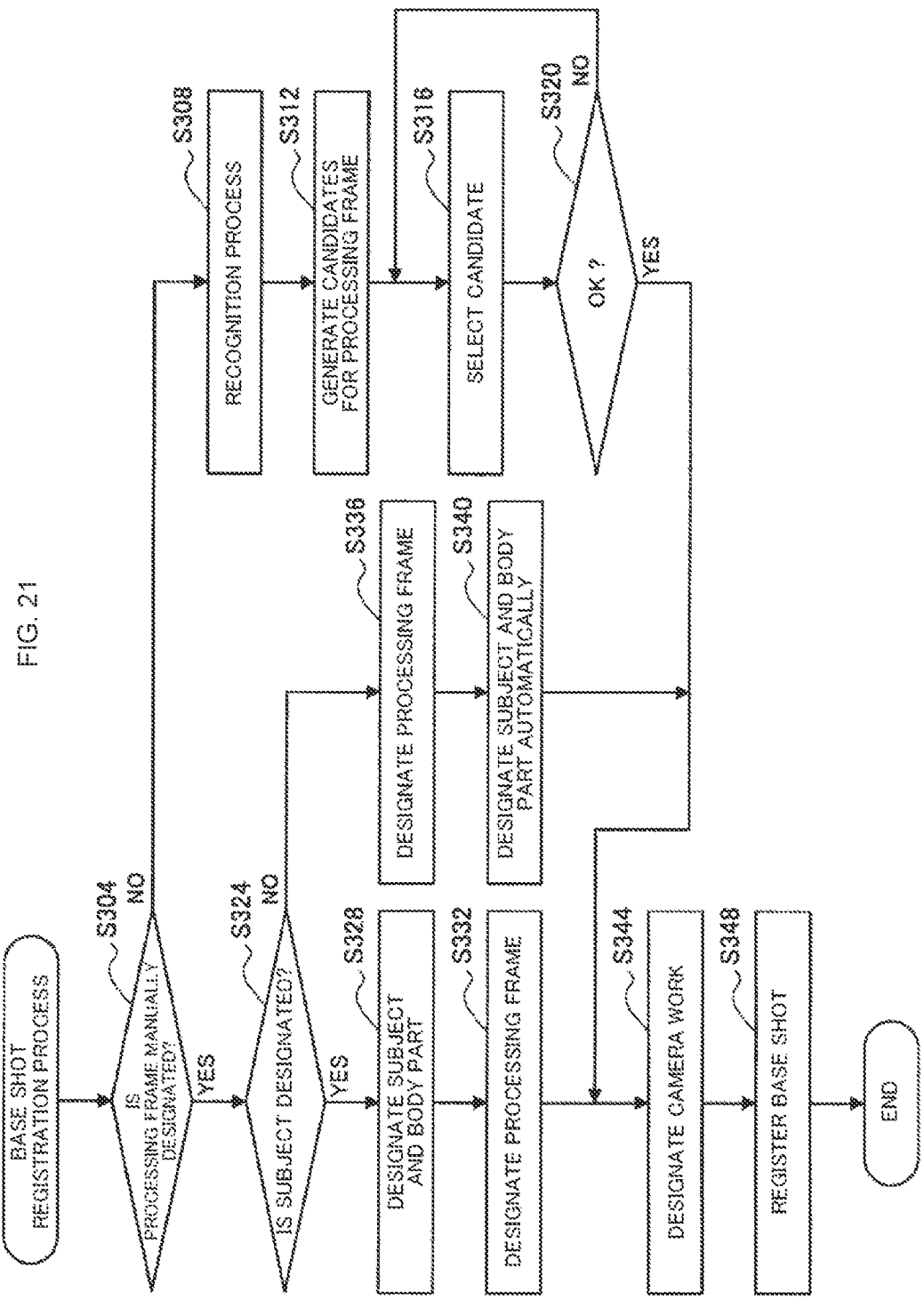

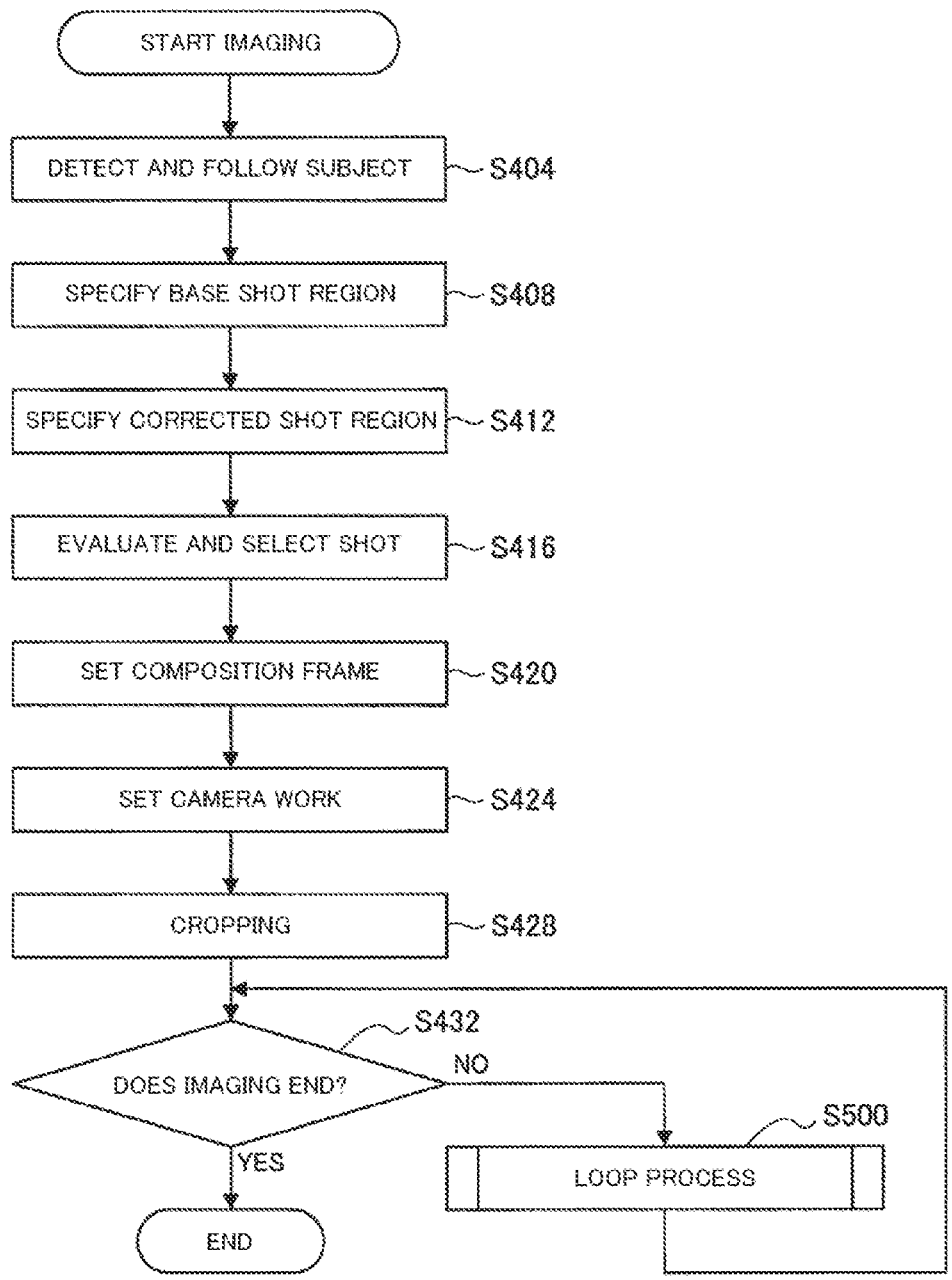

IMAGE PROCESSING DEVICE, AND IMAGE PROCESSING METHOD

CROSS REFERENCE TO RELATED APPLICATIONS

This application is a U.S. National Phase of International Patent Application No. PCT/JP2019/030088 filed on Jul. 31, 2019, which claims priority benefit of Japanese Patent Application No. JP 2018-170177 filed in the Japan Patent Office on Sep. 12, 2018. Each of the above-referenced applications is hereby incorporated herein by reference in its entirety.

TECHNICAL FIELD

The present disclosure relates to an image processing device, a program, and an image processing method.

BACKGROUND ART

In recent years, imaging in ultra-high definition (UHD) such as 4K or 8K which is a higher resolution than HD has become widespread. Since the resolution of UHD images obtained through UHD imaging are high, HD images can be cut from a plurality of composition frames of UHD images (HD cropping). According to HD cropping, since images obtained from a plurality of imaging devices can be generated using one imaging device, the number of video producers using HD cropping in low-budget video-filming fields has increased.

For example, PTL 1 discloses a technology for cutting out a partial image included in a part of an image from an image. Specifically, PTL 1 discloses a technology for cutting out a partial image of a region using a pre-decided digital camera work when a region of a partial image is designated by a user.

CITATION LIST

Patent Literature

[PTL 1]
JP 2009-177431A

SUMMARY

Technical Problem

However, effort is required for a user to designate a region for cutting out. It is also conceivable that a user designates a region with insufficient quality such as a region with partial cutting out, poor composition balance or a small number of pixels.

Accordingly, the present disclosure proposes a novel and improved image processing device, program, and image processing method capable of automatically setting a suitable composition frame.

Solution to Problem

According to the present disclosure, there is provided an image processing device including; an evaluation unit configured to evaluate whether a first region of a captured image satisfies a quality condition; and a composition frame setting unit configured to set a different composition frame in the captured image in accordance with an evaluation result of the first region.

According to the present disclosure, there is provided a program causing a computer to function as: an evaluation unit configured to evaluate whether a first region of a captured image satisfies a quality condition; and a composition frame setting unit configured to set a different composition frame in the captured image in accordance with an evaluation result of the first region.

According to the present disclosure, there is provided an image processing method including: evaluating whether a first region of a captured image satisfies a quality condition by a processor; and setting a different composition frame in the captured image in accordance with an evaluation result of the first region.

Advantageous Effects of Invention

According to the present disclosure, as described above, it is possible to automatically set a suitable composition frame.

The foregoing advantageous effects are not necessarily restrictive and any advantageous effects described in the present specification and other advantageous effects able to be ascertained from the present specification can be exerted in addition to the foregoing advantageous effects or instead of the foregoing advantageous effects.

BRIEF DESCRIPTION OF DRAWINGS

FIGS. 4A, 4B, 4C, 4D, 4E, and 4F are an explanatory diagram illustrating a first registration order of a base shot.

FIGS. 5A, 5B, 5C, 5D, and 5E are an explanatory diagram illustrating a second registration order of the base shot.

FIGS. 6A and 6B are an explanatory diagram illustrating a third registration order of the base shot.

FIGS. 11A, 11B, 11C, 11D, 11E, 11F, 11G, and 11H are an explanatory diagram illustrating a specific example of partial cutting out in the vertical direction.

FIGS. 16A, 16B, and 16C are an explanatory diagram illustrating an example of handling partial cutting out.

FIGS. 17A and 17B are an explanatory diagram illustrating an example of avoiding a bias of a margin.

FIGS. 18A and 18B are an explanatory diagram illustrating an example of avoiding a shortage in the number of pixels.

DESCRIPTION OF EMBODIMENTS

Figure 1:
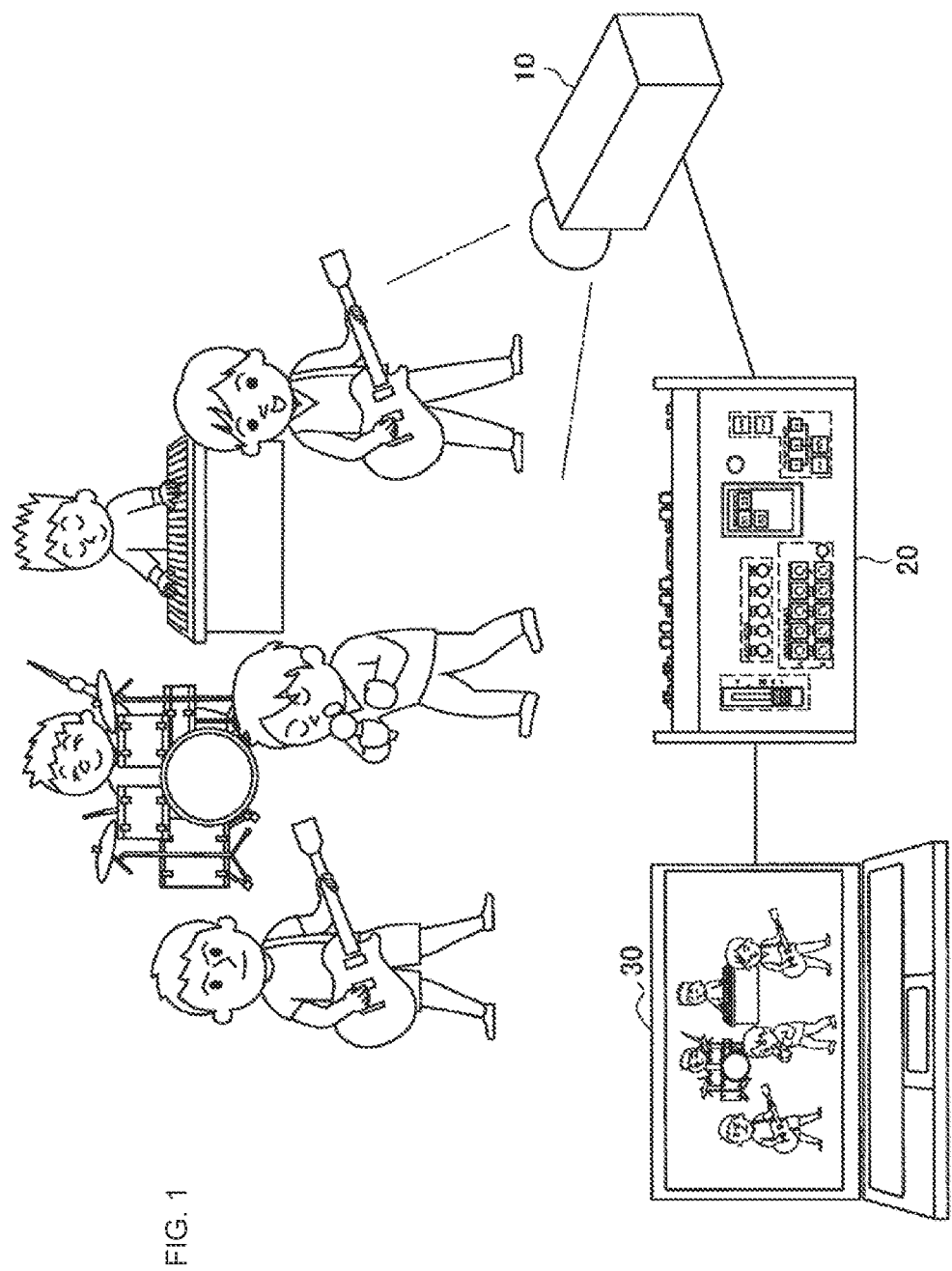
FIG. 1 is an explanatory diagram illustrating a configuration of an image processing system according to an embodiment of the present disclosure.

Hereinafter, preferred embodiments of the present disclosure will be described with reference to the appended figures. In the present specification and the figures, the same reference numerals are given to constituent elements that have substantially the same functional configurations and description thereof will be omitted.

In the present specification and the figures, different letters are suffixed to the same reference numerals to distinguish a plurality of constituent elements that have substantially the same functional configurations. Here, when it is not particularly necessary to distinguish a plurality of constituent elements that have substantially the same functional configurations, the same reference numerals are simply given to the plurality of constituent elements.

The present disclosure will be described in the following order.

1. Overview of image processing system
1-1. Configuration of image processing system
1-2. Registration of base shot
1-3. External appearance of switcher
1-4. Background
2. Configuration of switcher
2-1. Overview of each function
2-2. Quality evaluation of shot region
2-3. Generation of corrected shot
2-4. Continuous evaluation of shot
2-5. When recognition result is not obtained
3. Operation of switcher
3-1. Registration operation for base shot
3-2. Cropping operation
4. Conclusion

1. OVERVIEW OF IMAGE PROCESSING SYSTEM

An embodiment of the present disclosure relates to an image processing system cutting out (cropping) a partial image from an image obtained by one imaging device. In particular, the image processing system according to the embodiment of the present disclosure uses a UHD imaging device capable of performing UHD imaging and crops one or two or more HD images from a UHD image obtained by the UHD imaging device. The image processing system according to the embodiment of the present disclosure can also obtain an HD image by cropping an image with a resolution between UHD and HD and resizing the image. The image processing system can be used in, for example, a video production field. Hereinafter, an overview of the image processing system according to an embodiment of the present disclosure will be described.

(1-1. Configuration of Image Processing System)

FIG. 1 is an explanatory diagram illustrating a configuration of an image processing system according to an embodiment of the present disclosure. As illustrated in FIG. 1, the image processing system according to the embodiment of the present disclosure includes a UHD imaging device 10, a switcher 20, and an operation terminal 30.

The UHD imaging device 10 is an imaging device capable of imaging a subject in ultra HD (UHD) such as 4K or 8K. The UHD imaging device 10 outputs a UHD captured image obtained through the imaging to the switcher 20. FIG. 1 illustrates a quintet band which is making a musical performance as a subject. The UHD imaging device 10 outputs a UHD captured image of the quintet band to the switcher 20.

In FIG. 1, one UHD imaging device 10 is connected to the switcher 20, but the plurality of UHD imaging devices 10 may be connected to the switcher 20. In the present specification, an example in which the UHD imaging device 10 is used as an imaging device and a UHD captured image is processed will be mainly described, but a non-UHD imaging device that images a subject with a resolution lower than UHD may be used as an imaging device and an HD captured image or the like with a resolution lower than UHD may be processed. That is, in addition to the UHD imaging device 10 or instead of the UHD imaging device 10, the non-UHD imaging device may be connected to the switcher 20.

The switcher 20 is an image processing device that switches an output image among a plurality of images. In particular, the switcher 20 according to the embodiment of the present disclosure crops a plurality of HD images from an UHD captured image input for the UHD imaging device 10 and switches an output image among a plurality of images including the UHD captured image and the plurality of HD images. Here, specific examples of the cropping of the HD images and the switching of the output image will be described with reference to FIGS. 2 and 3.

Figure 2:
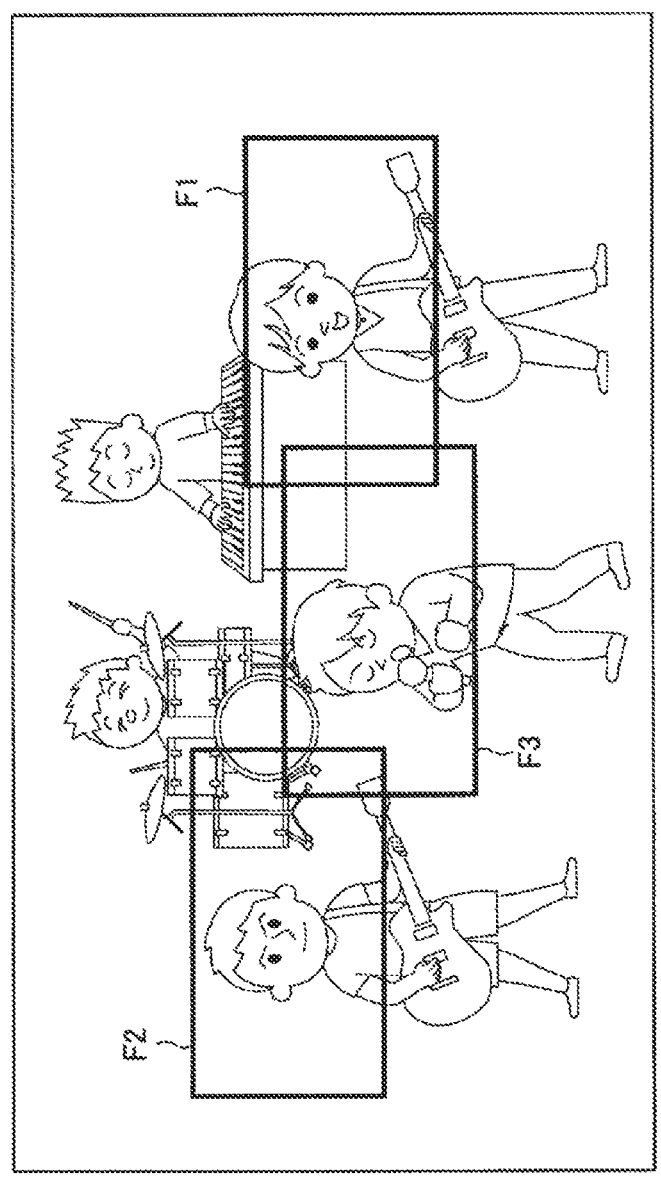
FIG. 2 is an explanatory diagram illustrating an example of cropping of an HD image.

FIG. 2 is an explanatory diagram illustrating an example of cropping of an HD image. In FIG. 2, a plurality of composition frames F1 to F3 are shown in the UHD captured image. The switcher 20 sets the composition frames F1 to F3 in the UHD captured image in accordance with, for example, a plurality of base shots. The switcher 20 crops the HD images included in the composition frames F1 to F3. The base shots are information regarding a main subject, a spacing, a body part of the main subject, a camera work, and the like. The switcher 20 can set composition frames which have spacings indicated by the base shots, including body parts of the main subject indicated by the base shots and to which camera work indicated by the base shots are applied. A method of registering the base shots will be described below with reference to FIGS. 4A 4B, 4C, 4D, 4E, 4F, 5A, 5B, 5C, 5D, 5E, 6A, and 6B.

Figure 3:
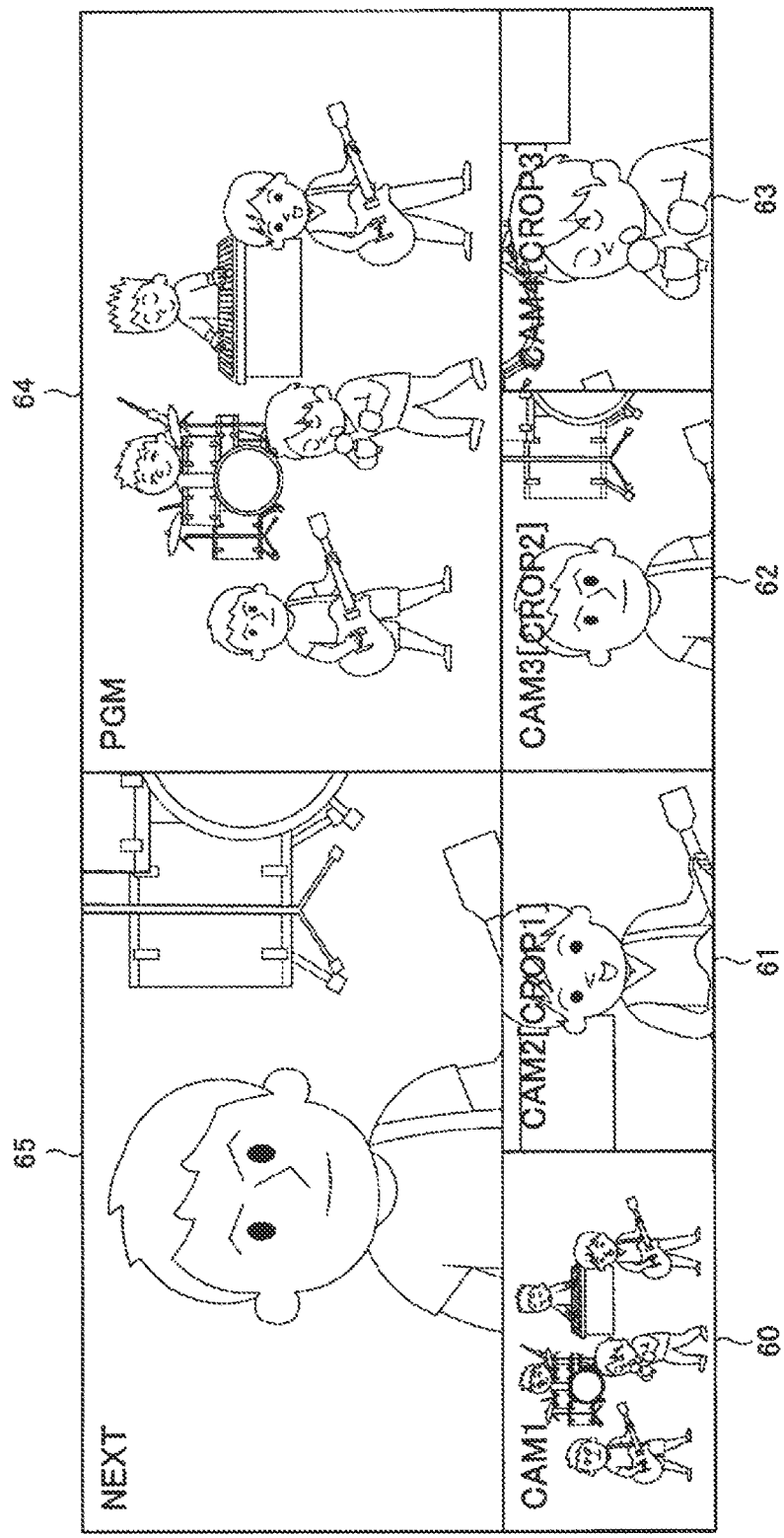
FIG. 3 is an explanatory diagram illustrating an operation screen for switching an output image.

FIG. 3 is an explanatory diagram illustrating an operation screen for switching an output image. As illustrated in FIG. 3, an operation screen includes a display region 60 of the UHD captured image, a display region 61 of an HD image cropped from the composition frame F1, a display region 62 of an HD image cropped from the composition frame F2, a display region 63 of an HD image cropped from the composition frame F3, a PGM display region 64, and a NEXT display region 65.

A user of the switcher 20 can select an output image or a subsequent output image from the images displayed in the display regions 60 to 64. An image selected as the output image is displayed in the PGM display region 64 and an image selected as a subsequent output image is displayed in the NEXT display region 65. In this way, according to the embodiment of the present disclosure, by switching an output image among a plurality of images including the UHD captured image and one or two or more HD images using the UHD captured image obtained by one UHD imaging device 10, it is possible to produce rich content even when the number of UHD imaging devices 10 used in the image processing system is small. The operation screen illustrated in FIG. 3 may be displayed on the operation terminal 30 or may be displayed on a display operation device other than the operation terminal 30.

The operation terminal 30 is an operation display device operated by a user inputting information or an instruction for an operation of the switcher 20. In FIG. 1, a notebook type personal computer (PC) is illustrated as the operation terminal 30, but another display operation device such as a touch panel device, a joystick, or a game controller may be used as the operation terminal 30.

The user can operate the operation terminal 30 to register, for example, base shots for setting the composition frames in the switcher 20. Hereinafter, several registration orders of the base shots will be described.

(1-2. Registration of Base Shot)

There are various registration orders of the base shots. Here, three types of registration orders in which the user designates different things will be described sequentially.

FIGS. 4A, 4B, 4C, 4D, 4E, and 4F are an explanatory diagram illustrating a first registration order. First, when the user designates a position of a subject in the UHD captured image illustrated in FIG. 4A, as illustrated in FIG. 4B, the switcher 20 disposes a marker 71 at the designated position.

Then, when a recognition result of the subject is at the designated position, the switcher 20 estimates a range of each body part of the subject and disposes a part range indication 73 indicating the range of each body part, as illustrated in FIG. 4C. When the recognition result of the subject is not at the designated position, the switcher 20 dispose the part range indication 73 in accordance with a default setting and adjusts the range of each body part in response to a user operation. Examples of the body parts include a face, a chest, a waist, and a part below a knee.

Thereafter, as illustrated in FIG. 4D, the user designates a processing frame 75 by, for example, drag-and-drop. Then, the user adjusts the position and the size of the processing frame 75 in FIG. 4E. When the processing frame 75 is confirmed, as illustrated in FIG. 4F, the user sets a camera work.

In the foregoing registration order, information indicating the main subject designated by the user, information indicating a relative position and size (spacing) of the processing frame 75 for the body part included in the processing frame 75, information indicating the body part included in the processing frame 75, and information indicating the camera work designated by the user are registered as base shots. The spacing can also be said to be a margin in the horizontal direction or the vertical direction with respect to the main subject of the processing frame 75. As the camera work, zooming-in, zooming-out, panning-in, panning-out, and following can be exemplified. The follow is a camera work for following a subject which is moving while maintaining an instruction of the base shot. At the time of an IN operation, the camera work is performed so that a composition frame specified in accordance with the base shot becomes a goal. At the time of an OUT operation, the camera work is performed so that the composition frame specified in accordance with the base shot is set as a start.

FIGS. 5A, 5B, 5C, 5D, and 5E are an explanatory diagram illustrating a second registration order. In the second registration order, the switcher 20 performs a recognition process of a UHD captured image illustrated in FIG. 5A. Based on a recognition result, the processing frame 75 is automatically extracted and disposed, as illustrated in FIG. 5B. When the processing frame 75 is not a desired processing frame, the user performs an operation of changing the processing frame on the operation terminal 30. In response to the changing operation for the processing frame, the switcher 20 disposes a subsequent processing frame 76, as illustrated in FIG. 5C. When the processing frame 76 is the desired processing frame, the user sets the camera work, as illustrated in FIG. 5D.

As the changing operation for the processing frame, there are a changing operation for the main subject and a changing operation for a composition. Transition from FIG. 5B to FIG. 5C is based on the changing operation of the main subject. When the changing operation of the composition is performed in FIG. 5C, a processing frame 77 of which the composition is changed can be disposed, as illustrated in FIG. 5E. The changing operation for the main object may be performed, for example, through an operation on left and right keys of the operation terminal 30. The changing operation for the composition may be performed through the key operation on the operation terminal 30, for example.

In the foregoing registration order, information indicating the main subject included in the processing frame selected by the user, information indicating a relative position and size (spacing) of the processing frame for the body part of the main subject included in the processing frame, information indicating the body part of a subject included in the processing frame, and information indicating the camera work designated by the user are registered as base shots.

FIGS. 6A and 6B are an explanatory diagram illustrating a third registration order. In the third registration order, the user designates a processing frame 78 in the UHD captured image illustrated in FIG. 6A by, for example, drag-and-drop, as illustrated in FIG. 6B. When the processing frame 78 is designated, the switcher 20 specifies a subject closest to a center of gravity of the processing frame 78 as a main subject and specifies a body part of the main subject included in the processing frame 78.

The switcher 20 registers the specified main subject, information indicating a relative position and size (spacing) of the processing frame 78 for the specified body part, information indicating the specified body part, and information indicating a camera work designated by the user as base shots.

In each of the above-described first to third registration orders, the setting of the camera work may be omitted.

(1-3. External Appearance of Switcher)

Next, an external appearance of the switcher 20 will be described with reference to FIG. 7.

Figure 7:
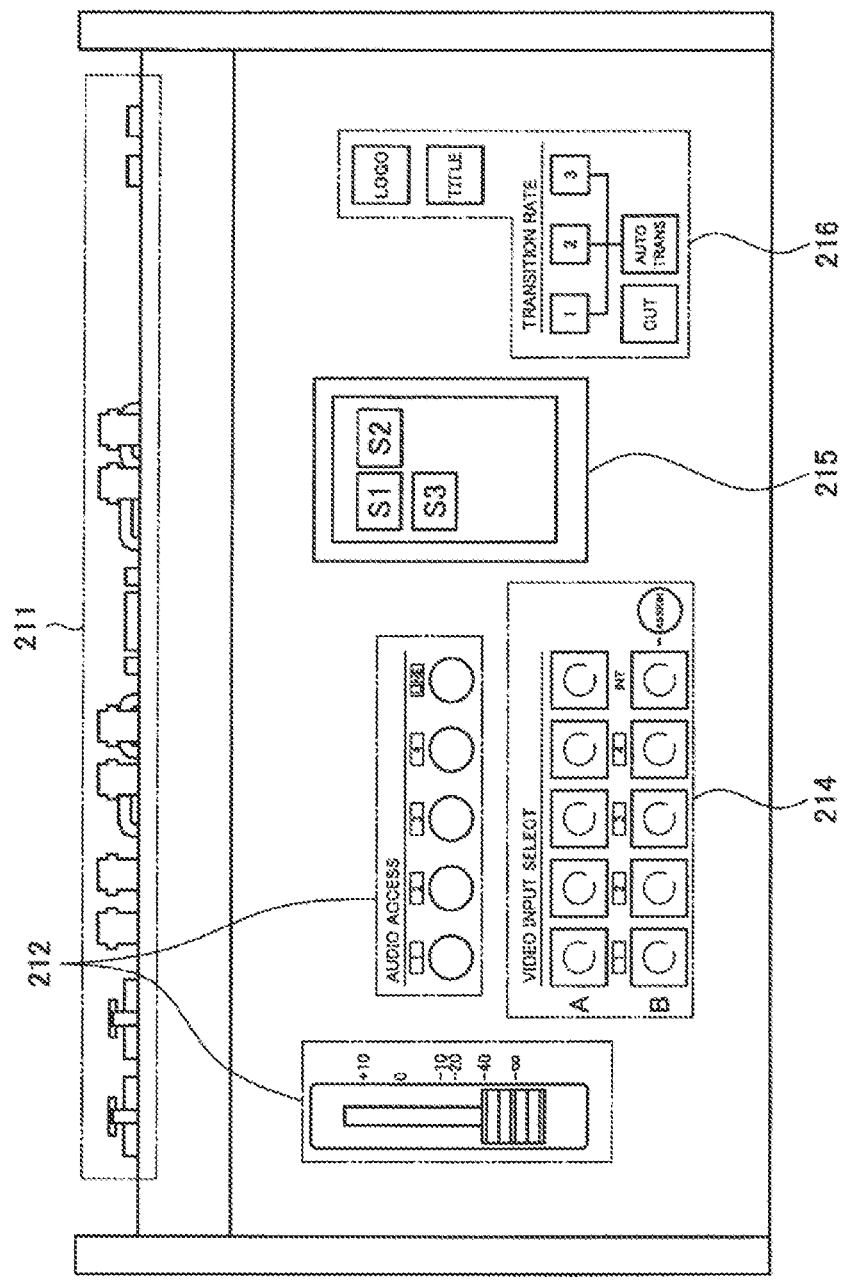
FIG. 7 is an explanatory diagram illustrating an external appearance configuration of a switcher 20.

FIG. 7 is an explanatory diagram illustrating the external appearance configuration of the switcher 20. As illustrated in FIG. 7, the switcher 20 includes a terminal group 211, a sound operation unit 212, an image selection unit 214, a base shot selection unit 215, and an output image switching unit 216.

The terminal group 211 includes an input terminal for inputting an image and a sound to the switcher 20 and an output terminal for outputting an image and a sound from the switcher 20. For example, the UHD captured image obtained by the UHD imaging device 10 is input to the switcher 20 via the terminal group 211.

The sound operation unit 212 is configured to perform an operation regarding a sound.

The image selection unit 214 is configured to select a PGM image and a NEXT image from a plurality of images including the UHD captured image and a plurality of HD images. For example, the image selection unit 214 includes first to fourth buttons and the switcher 20 sets an image corresponding to a button selected among the first to fourth buttons as the PGM image or the NEXT image.

The base shot selection unit 215 is configured to perform an operation of associating a base shot with each button of the image selection unit 214. For example, a base shot S1 used to specify the composition frame F1 described with reference to FIG. 2 may be associated with the second button, a base shot S2 used to specify the composition frame F2 may be associated with the third button, and a base shot S3 used to specify the composition frame F3 may be associated with the fourth button.

The output image switching unit 216 is configured to perform an operation of switching the PGM image to an image set in the present NEXT image.

(1-4. Background)

In the method of typically setting the composition frame in accordance with the above-described base shot, quality of the composition frame is insufficient in some cases. For example, a composition frame in which there is a concern regarding the quality, such as occurrence of partial cutting out of a subject, a poor composition balance, or a small number of pixels, can be set depending on circumstances such as a change of a composition frame set in accordance with a base shot with movement of the main subject, or a change in a state of another subject included in the composition frame set in accordance with a base shot. Here, composition frames in which there is a concern regarding the quality will be described more specifically with reference to FIGS. 8A, 8B, and 8C.

Figure 8A:
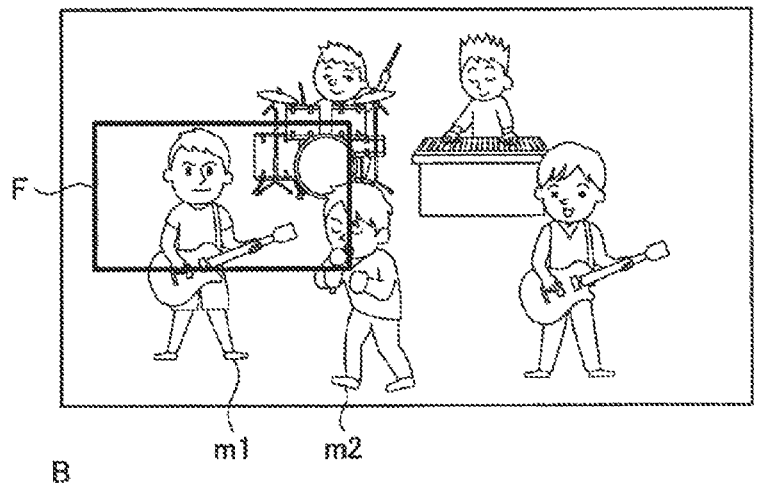
FIGS. 8A, 8B, and 8C are an explanatory diagram illustrating specific examples of composition frames in which there is a concern regarding the quality.
Figure 8B:
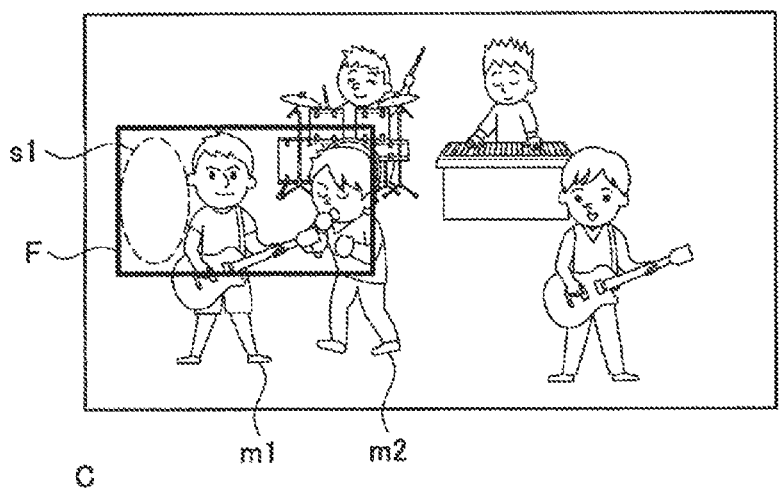
Figure 8C:
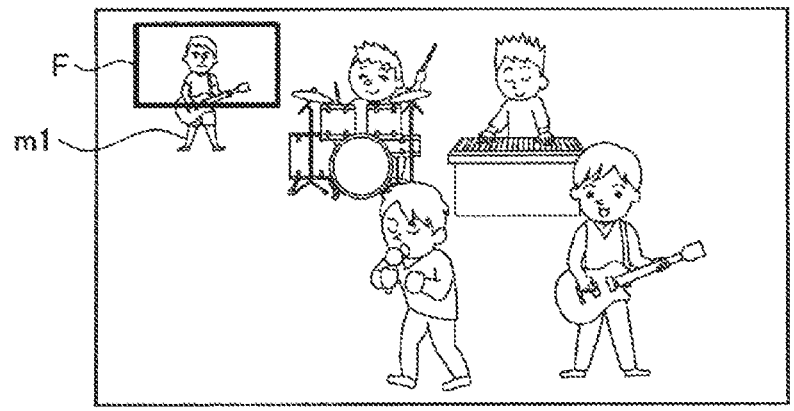

FIGS. 8A, 8B, and 8C are an explanatory diagram illustrating specific examples of composition frames in which there is a concern regarding the quality. In the composition frame F illustrated in FIG. 8A, a subject m2 which is not a main subject is partially cut out have been photographed in addition to a subject m1 which is a main subject. In the composition frame F illustrated in FIG. 8B, the subject m2 is not partially cut out, but there is a margin s1 biased to the left of the main subject m1, and thus a composition balance is poor. The composition frame F illustrated in FIG. 8C is small. Therefore, the number of pixels of the composition frame F is less than a lower limit.

The present inventors have devised an embodiment of the present disclosure in view of the foregoing circumstances. According to the embodiment of the present disclosure, it is possible to automatically set the composition frame for which a concern about quality is reduced. Hereinafter, a configuration and an operation for a cropping process in the switcher 20 according to the embodiment of the present disclosure will be described sequentially in detail.

2. CONFIGURATION OF SWITCHER (2-1. Overview of Each Function)

Figure 9:
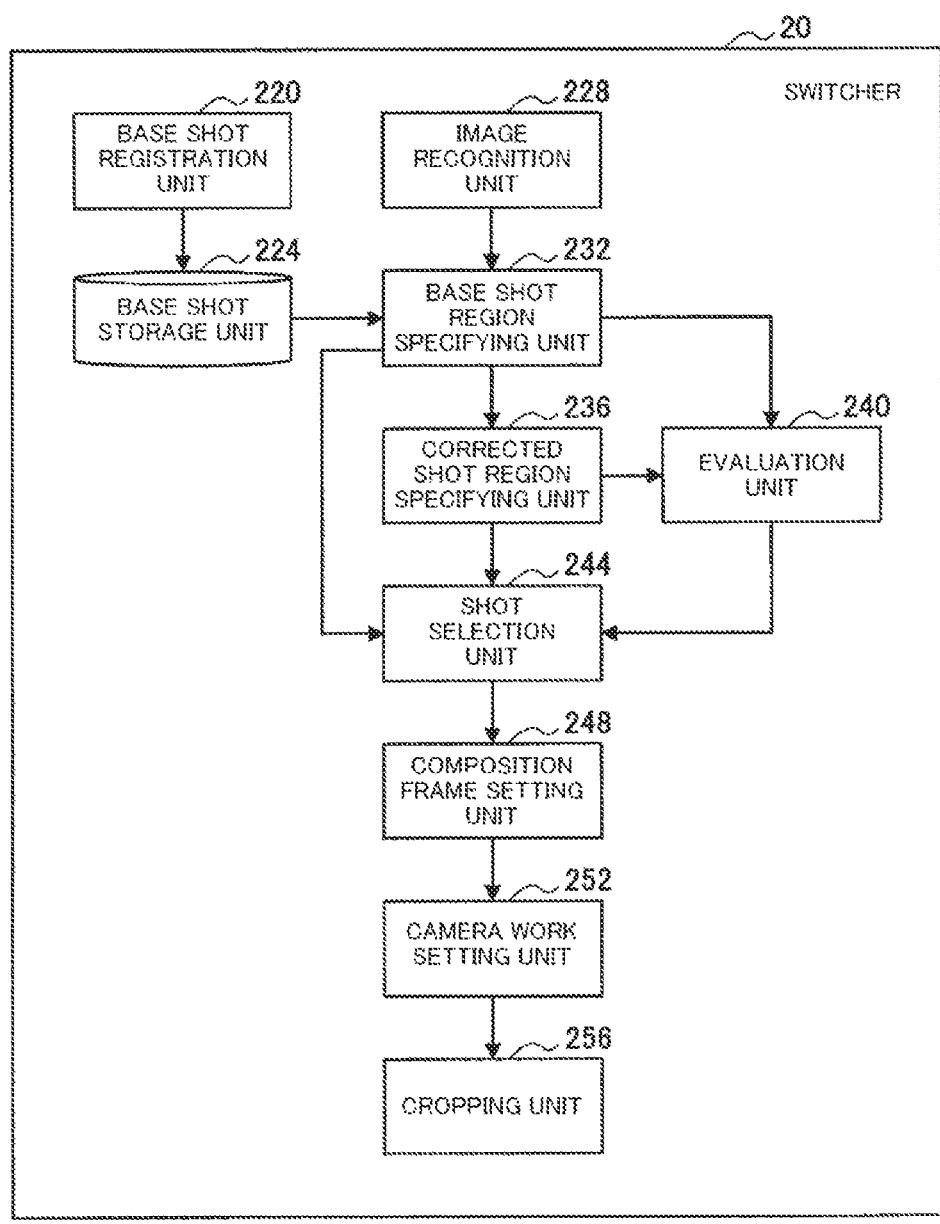
FIG. 9 is an explanatory diagram illustrating a configuration for a cropping process in the switcher 20 according to the embodiment of the present disclosure.
Figure 10A:
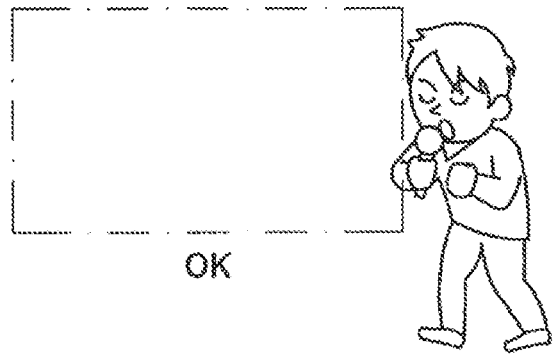
FIGS. 10A, 10B, 10C, and 10D are an explanatory diagram illustrating a specific example of partial cutting out in the horizontal direction.
Figure 10B:
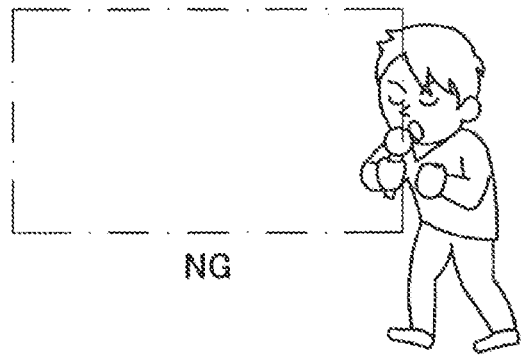
Figure 10C:
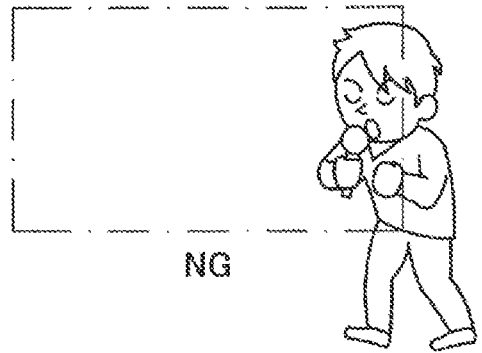
Figure 10D:
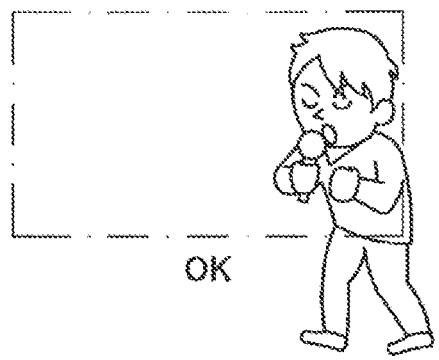

FIG. 9 is an explanatory diagram illustrating a configuration for a cropping process in the switcher 20 according to the embodiment of the present disclosure. As illustrated in FIG. 9, the switcher 20 according to the embodiment of the present disclosure includes a base shot registration unit 220, a base shot storage unit 224, an image recognition unit 228, a base shot region specifying unit 232, a corrected shot region specifying unit 236, an evaluation unit 240, a shot selection unit 244, a composition frame setting unit 248, a camera work setting unit 252, and a cropping unit 256. Respective functions of the base shot registration unit 220 to the cropping unit 256 can be realized by software and hardware such as a CPU and a RAM provided in the switcher 20 in cooperation.

The base shot registration unit 220 registers the base shots in the base shot storage unit 224 in the registration order described in "1-2. Registration of base shot". The base shot storage unit 224 stores the base shots.

The image recognition unit 228 sequentially recognizes UHD captured images sequentially input from the UHD imaging device 10. For example, the image recognition unit 228 detects a subject (for example, a face) in the UHD captured image and performs following from the subject detected in the UHD captured image before an immediately previous frame.

The base shot region specifying unit 232 specifies a base shot region from the UHD captured image in accordance with the base shot stored in the base shot storage unit 224 using a recognition result from the image recognition unit 228. Specifically, the base shot region specifying unit 232 specifies a base shot region including a body part of a main subject indicated by the base shot and having a spacing indicated by the base shot. A base shot is an example of a first rule, a base shot region is an example of a first region, and the base shot region specifying unit 232 is an example of a first region specifying unit.

The corrected shot region specifying unit 236 corrects the base shot stored in the base shot storage unit 224, generates a corrected shot, and specifies a corrected shot region from the UHD captured image in accordance with the corrected shot. Specifically, the corrected shot region specifying unit 236 specifies a corrected shot region including the body part of the main subject indicated by the corrected shot and has a spacing indicated by the corrected shot. A method of generating the corrected shot will be described below in "2-3. Generation of corrected shot". The corrected shot is an example of a second rule, the corrected shot region is an example of a second region, and the corrected shot region specifying unit 236 is an example of a second region specifying unit.

The evaluation unit 240 evaluates whether the base shot region specified by the base shot region specifying unit 232 satisfies a quality condition and evaluates whether the corrected shot region specified by the corrected shot region specifying unit 236 satisfies the quality condition. A method of evaluating quality in the evaluation unit 240 will be described below in "2-2. Quality evaluation of shot region".

The shot selection unit 244 selects the base shot or the corrected shot generated by the corrected shot region specifying unit 236 based on an evaluation result from the evaluation unit 240. Specifically, the shot selection unit 244 selects the base shot when the base shot region satisfies the quality condition, and selects the corrected shot when the base shot region does not satisfy the quality condition and the corrected shot region satisfies the quality condition. The shot selection unit 244 maintains the selection of the corrected shot until the corrected shot region does not satisfy the quality condition, after the corrected shot has been temporarily selected. Stability of the shot is improved because of this configuration. The shot selection unit 244 is an example of a rule selection unit.

The composition frame setting unit 248 sets the composition frame in the UHD captured image based on the shot selected by the shot selection unit 244. As can be understood from the foregoing description, the shot selected by the shot selection unit 244 is different in accordance with an evaluation result of the quality of the base shot region. Therefore, the composition frame setting unit 248 sets a different composition frame in the UHD captured image in accordance with the evaluation result of the quality of the base shot region. The composition frame set by the composition frame setting unit 248 may correspond to a different region from the base shot region and the corrected shot region. For example, the composition frame setting unit 248 may set the composition frame by adjusting to a region in accordance with the shot selected by the shot selection unit 244 for a smooth change between the frame images.

The camera work setting unit 252 sets the camera work indicated by the shot selected by the shot selection unit 244 in the composition frame set by the composition frame setting unit 248. As the camera work, zooming-in, zooming-out, panning-in, and panning-out can be exemplified.

The cropping unit 256 is an example of a cutting unit that crops the HD image included in the composition frame set by the composition frame setting unit 248. When the camera work is performed, the cropping unit 256 crops the HD image included in the composition frame to which the camera work is applied.

(2-2. Quality Evaluation of Shot Region)

The overview of each function of the switcher 20 according to the embodiment of the present disclosure has been described above. Next, quality evaluation of the base shot region and the corrected shot region in the evaluation unit 240 will be described more specifically. Hereinafter, the bases shot and the corrected shot are generally referred to as the shot, and the base shot region and the corrected shot region are generally referred to as the shot region in some cases.

—Evaluation of Partial Cutting Out—

The evaluation unit 240 evaluates whether the shot region satisfies the quality condition taking into account presence of a subject (another subject) other than the main subject in the shot region. For example, the quality condition includes a condition regarding partial cutting out and the evaluation unit 240 evaluates whether a condition regarding partial cutting out is satisfied based on the degree that the other subject is partially cut out with regard to the shot region in which partial cutting out of the other subject occurs. As partial cutting out of the subject, partial cutting out in the horizontal direction or partial cutting out in the vertical direction can occur.

With regard to partial cutting out in the horizontal direction, the evaluation unit 240 evaluates that the shot region does not satisfy the condition regarding partial cutting out, for example, based on the face of the subject which is included in the shot region and the size of the face of a subject included in the shot region which is less than a predetermined proportion (for example, 80%) with respect to the size of the entire face of the subject in the horizontal direction. A specific example of partial cutting out in the horizontal direction will be described with reference to FIGS. 10A, 10B, 10C, and 10D. Here, the condition regarding partial cutting out in the horizontal direction is not limited to a condition to be described here and another condition may be applied to the condition regarding partial cutting out in the horizontal direction.

FIGS. 10A, 10B, 10C, and 10D are an explanatory diagram illustrating a specific example of partial cutting out in the horizontal direction. In FIGS. 10A 10B 10C 10D and the subsequent figures, the shot region is indicated by a one-dot chain line rectangle. In the example illustrated in FIG. 10A, since the face of the subject is not included in the shot region, partial cutting out in the horizontal direction does not occur. In the example illustrated in FIG. 10D, since the entire face of the subject is included in the shot region, the condition regarding partial cutting out is satisfied. Conversely, in the examples illustrated in FIGS. 10B and 10C, since the face of the subject is included in the shot region and the size of the face of the subject included in the shot region is less than a predetermined proportion, the condition regarding partial cutting out is not satisfied.

With regard to partial cutting out in the vertical direction, the evaluation unit 240 evaluates that the shot region does not satisfy the condition regarding partial cutting out, for example, based on a state in which the eyebrows of the subject are included in the shot region and the chest of the subject is not included in the shot region and a state in which a lower part of the face of the subject is included in the shot region and the eyebrows of the subject are not included in the shot region. A specific example of partial cutting out in the vertical direction will be described with reference to FIGS. 11A, 11B, 11C, 11D, 11E, 11F, 11G, and 11H. Here, the condition regarding partial cutting out in the vertical direction is not limited to the conditions described here and another condition may be applied to the condition regarding partial cutting out in the vertical direction. For example, eyes, the forehead, or the like may be used instead of the eyebrows or a neck, an abdominal part, or the like may be used instead of the chest.

FIGS. 11A, 11B, 11C, 11D, 11E, 11F, 11G, and 11H are an explanatory diagram illustrating a specific example of partial cutting out in the vertical direction. In an example illustrated in FIG. 11A, since both the eyebrows of the subject and the lower part of the face of the subject are not included in the shot region, partial cutting out in the vertical direction does not occur. In examples illustrated in FIGS. 11B and 11C, since the eyebrows of the subject are included in the shot region and the chest of the subject is not included in the shot region, the condition regarding partial cutting out is not satisfied. In examples illustrated in FIGS. 11D, 11E, and 11F, since the eyebrows of the subject and the chest of the subject are included in the shot region, the condition regarding partial cutting out is satisfied. In an example illustrated in FIG. 11G, since the lower part of the face of the subject is included in the shot region and the eyebrows of the subject are not included in the shot region, the condition regarding partial cutting out is not satisfied. In an example illustrated in FIG. 11H, since both the eyebrows and the lower part of the face of the subject are not included in the shot region, the condition regarding partial cutting out is satisfied. A method of recognizing the eyebrows is not particularly limited and the eyebrows may be recognized using a known method of detecting a facial organ. As the known method of detecting a facial organ, for example, "One millisecond face alignment with an ensemble of regression trees (<http://www.csc.kth.se/~vahidk/face_ert.html>)" can be exemplified. As another method, regions of the eyebrows may be inferred from a proportion of a face frame width with respect to the center of gravity of a frame of the detected face region.

Here, when the size of the face of another subject is less than a predetermined proportion (for example, less than 30%) with respect to the size of the face of the main subject, the evaluation unit 240 may evaluate that the shot region satisfies the condition regarding partial cutting out independently of that the other subject is partially cut out. A specific example of determination of partial cutting out in which a proportion of a face size is taken into account will be described with reference to FIGS. 12A, 12B, and 12C.

Figure 12A:
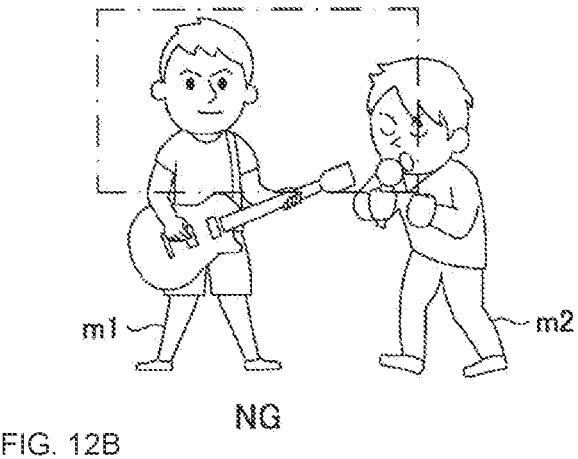
FIGS. 12A, 12B, and 12C are an explanatory diagram illustrating a specific example of a determination of partial cutting out in which a proportion of a face size is taken into account.
Figure 12B:
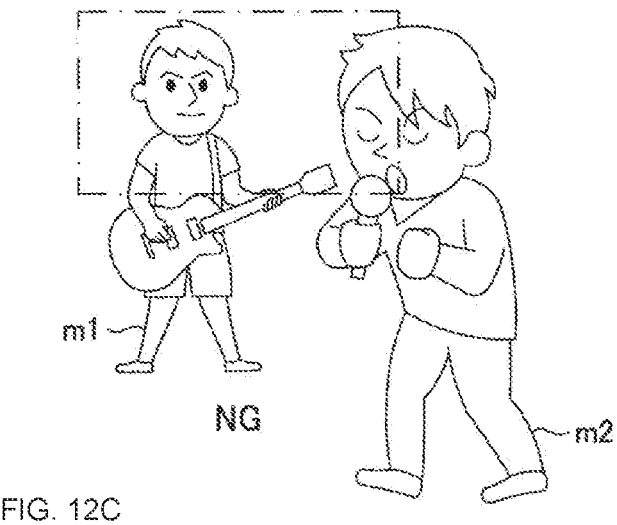
Figure 12C:
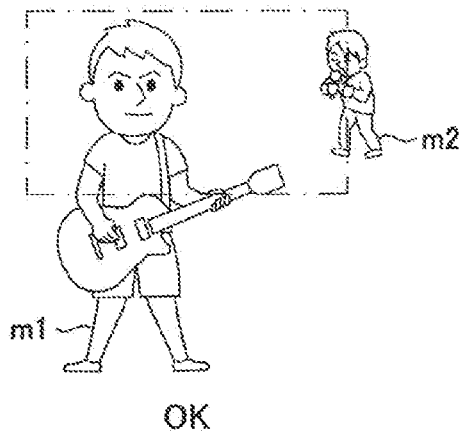

FIGS. 12A, 12B, and 12C are an explanatory diagram illustrating a specific example of evaluation of partial cutting out in which a proportion of a face size is taken into account. In an example illustrated in FIG. 12A, a part of the face of the subject m2 is included in the shot region in addition to the main subject m1 and the size of the face of the subject m1 included in the shot region with respect to the size of the entire face of the subject m2 in the horizontal direction is less than a predetermined proportion. Further, the size of the face of the main subject m1 is almost equal to the size of the face of the subject m2. Therefore, the evaluation unit 240 evaluates that the shot region illustrated in FIG. 12A does not satisfy the condition regarding partial cutting out.

In an example illustrated in FIG. 12B, a part of the face of the subject m2 is included in the shot region in addition to the main subject m1 and the size of the face of the subject m1 included in the shot region with respect to the size of the entire surface of the subject m2 in the horizontal direction is less than the predetermined proportion. Further, the size of the face of the subject m2 is greater than the size of the face of the main subject m1. Therefore, the evaluation unit 240 evaluates that the shot region illustrated in FIG. 12B does not satisfy the condition regarding partial cutting out.

In an example illustrated in FIG. 12C, a part of the face of the subject m2 is included in the shot region in addition to the main subject m1 and the size of the face of the subject m1 included in the shot region with respect to the entire face of the subject m2 in the horizontal direction is less than the predetermined proportion. However, the size of the face of the subject m2 is sufficiently smaller than the size of the face of the main subject m1. Therefore, the evaluation unit 240 evaluates that the shot region illustrated in FIG. 12C satisfies the condition regarding partial cutting out.

Evaluation of Composition Balance

The quality condition includes a condition regarding a composition balance of the shot region and the evaluation unit 240 evaluates that a shot region in which there is a bias to a margin of the main subject and another subject in the horizontal direction or the vertical direction does not satisfy the condition regarding the composition balance. Hereinafter, specific examples of a method of evaluating the bias of the margin in the horizontal direction and a method of evaluating the bias of the margin in the vertical direction will be described with reference to FIGS. 13 and 14.

Figure 13:
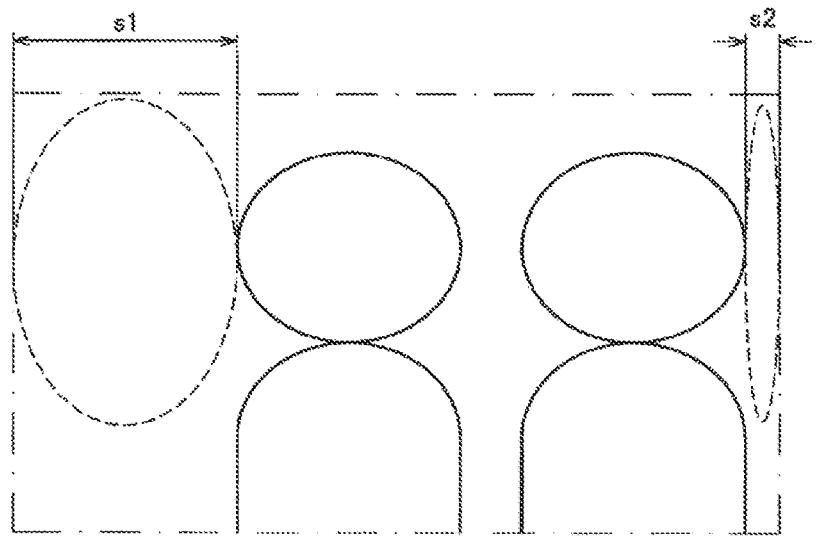
FIG. 13 is an explanatory diagram illustrating a specific example of a shot region in which there is a bias of a margin in the horizontal direction.

FIG. 13 is an explanatory diagram illustrating a specific example of a shot region in which there is a bias in the horizontal direction. FIG. 13 illustrates a length s1 of a left margin of the main subject and the other subject and a length s2 of a right margin of the main subject and the other subject. (s1/s2) means a size of the left margin with respect to the right margin. When (s1/s2) is excessively large, it is considered that there is the bias of the margin to the left. Therefore, when (s1/s2) is equal to or greater than a horizontal threshold, the evaluation unit 240 determines that there is a bias of the margin in the horizontal direction. Similarly, when (s2/s1) is excessively large, it is considered that there is the bias of the margin to the right. Therefore, when (s2/s1) is equal to or greater than the horizontal threshold, the evaluation unit 240 may determine that there is the bias of the margin in the horizontal direction.

Figure 14:
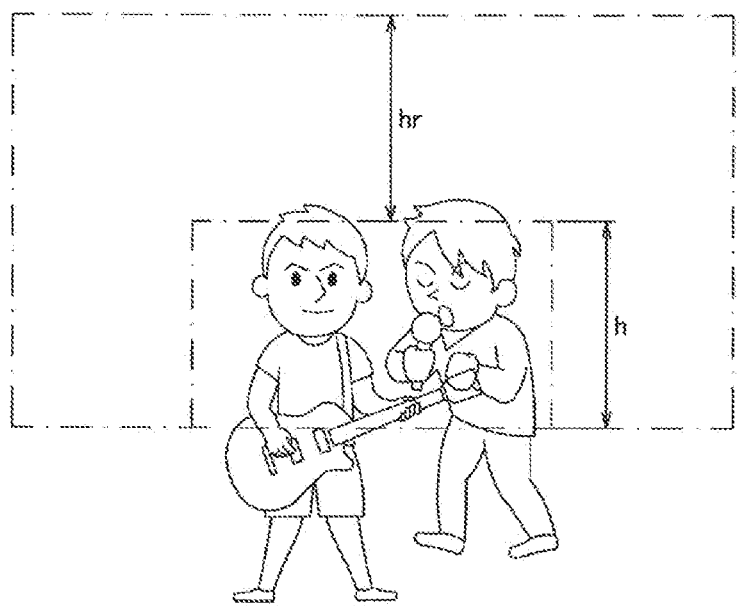
FIG. 14 is an explanatory diagram illustrating a specific example of a shot region in which there is a bias of a margin in the vertical direction.

FIG. 14 is an explanatory diagram illustrating a specific example of a shot region in which there is a bias of a margin in the vertical direction. FIG. 14 illustrates a height h of a rectangle circumscribing a subject and a margin height hr in the vertical direction. (hr/h) means a size of a margin in the vertical direction with respect to the height of the subject. When (hr/h) is excessively large, it is considered that the margin biased to the size of the subject is in the vertical direction. Therefore, when (hr/h) is equal to or greater than the vertical threshold, the evaluation unit 240 determines that there is a bias of the margin in the vertical direction.

—Shortage in the Number of Pixels—

The quality condition includes a condition regarding the number of pixels of a shot region, and the evaluation unit 240 evaluates that a shot region in which the number of pixels is less than a threshold does not satisfy the condition regarding the number of pixels. Hereinafter, a specific example of a shot region in which the number of pixels is less than the threshold will be described with reference to FIG. 15.

Figure 15:
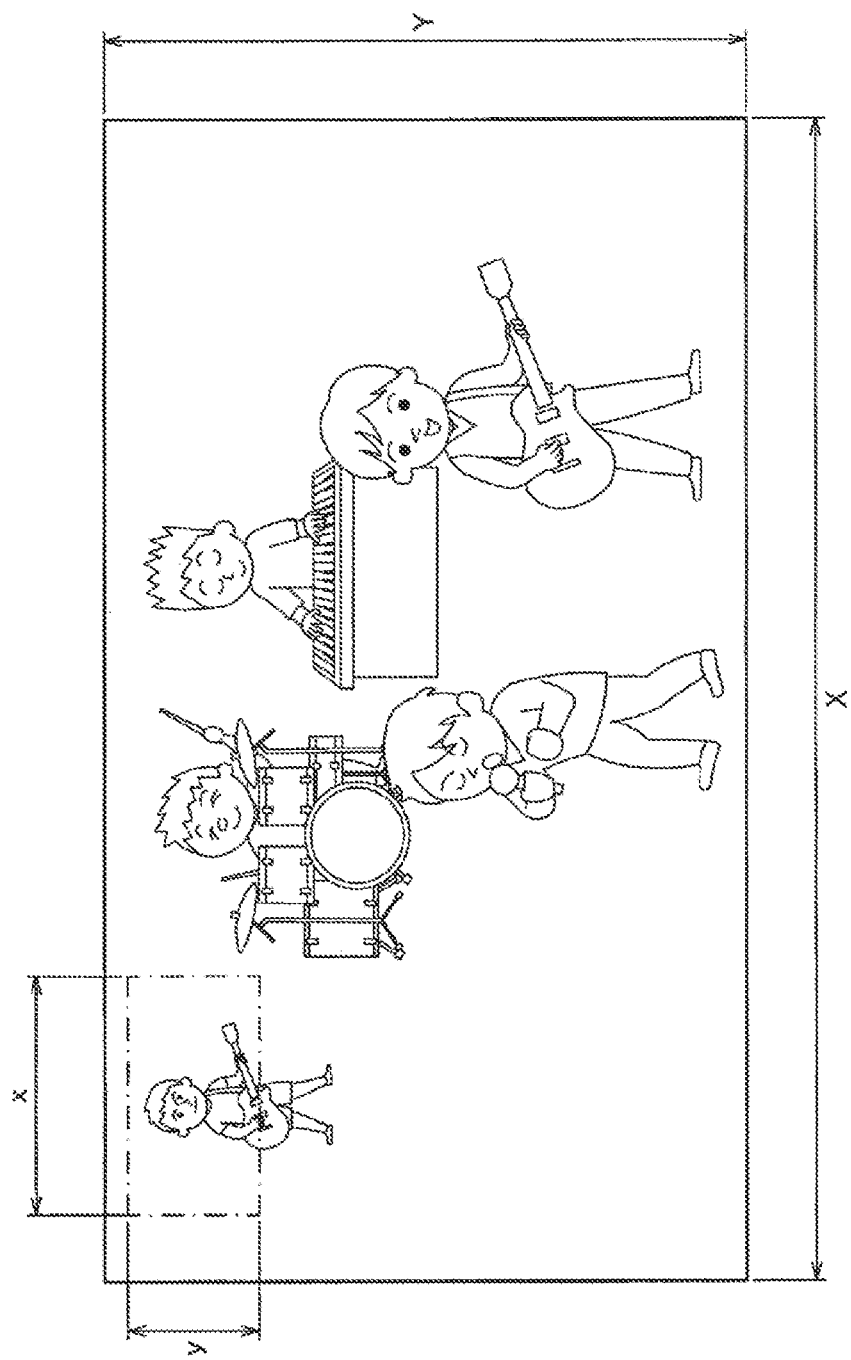
FIG. 15 is an explanatory diagram illustrating a specific example of a shot region in which the number of pixels is less than a threshold.

FIG. 15 is an explanatory diagram illustrating a specific example of a shot region in which the number of pixels is less than the threshold. In the example illustrated in FIG. 15, X is the number of pixels of the UHD captured image in the horizontal direction and Y is the number of pixels in the vertical direction. On the other hand, x is the number of pixels of a shot region in the horizontal direction and y is the number of pixels in the vertical direction. When $(x*y)/(X*Y)$ is less than a threshold (for example, less than 10%), the evaluation unit 240 evaluates that the shot region does not satisfy the condition regarding the number of pixels.

(2-3. Generation of Corrected Shot)

The quality evaluation of the shot region has been described above. Next, a specific example of a corrected shot generated by the corrected shot region specifying unit 236 when the base shot region does not satisfy the quality condition will be described.

—When Partial Cutting Out Occurs—

When the base shot region does not satisfy the condition regarding partial cutting out, the corrected shot region specifying unit 236 generates a corrected shot indicating a different body part or spacing from a body part or spacing of the main subject indicated by the base shot. The size of the corrected shot region specified in accordance with the corrected shot is different from that of the base shot region. As a result, the corrected shot region can satisfy the condition regarding partial cutting out. Hereinafter, an example of handling partial cutting out will be described with reference to FIGS. 16A 16B and 16C.

FIGS. 16A, 16B, and 16C are an explanatory diagram illustrating an example of handling partial cutting out. In an example illustrated in FIG. 16A, the base shot indicates a face and a chest as body parts of the subject and the subject m2 which is not the main subject is photographed in the base shot region 81 in a state in which the subject m2 is partially cut out in addition a bust shot of the subject m1 which is the main subject.

Accordingly, the corrected shot region specifying unit 236 may generate a corrected shot indicating more body parts than the body parts indicated by the base shot. For example, the corrected shot region specifying unit 236 may generate a corrected shot indicating a face, a chest, and a waist. In this case, the corrected shot region specifying unit 236 can specify a corrected shot region 82-1 including a waist shot of the main subject m1 in accordance with the corrected shot, as illustrated in FIG. 16B. The corrected shot region 82-1 is larger than the base shot region 81 illustrated in FIG. 16A and includes the subject m2 so that the condition regarding partial cutting out is satisfied.

As another method, the corrected shot region specifying unit 236 may generate a corrected shot indicating a margin smaller than a margin indicated by the base shot. For example, the corrected shot region specifying unit 236 may generate a corrected shot in which a right margin of the main subject is less than that of the base shot. In this case, the corrected shot region specifying unit 236 can specify a corrected shot region 82-2 which includes the main subject m1 and does not include the subject m2 in accordance with the corrected shot, as illustrated in FIG. 16C.

—When there is Bias in Margin—

When the base shot region does not satisfy the condition regarding the composition balance, the corrected shot region specifying unit 236 generates a corrected shot in which the size of a margin in the horizontal direction or the vertical direction is different from that of the base shot. Hereinafter, an example of avoiding a bias of a margin will be described with reference to FIGS. 17A and 17B.

FIGS. 17A and 17B are an explanatory diagram illustrating an example of avoiding a bias of a margin. In an example illustrated in FIG. 17A, a margin s biased to the left of the main subject m1 is in a base shot region 83, and thus a composition balance is poor. In this case, the corrected shot region specifying unit 236 can generate a corrected shot in which the left margin is smaller and the right margin is larger than in the base shot. Then, the corrected shot region specifying unit 236 can specify a corrected shot region 84 in which the bias of the margins is avoided, as illustrated in FIG. 17B, in accordance with the corrected shot.

—When the Number of Pixels Lacks—

When the base shot region does not satisfy the condition regarding the number of pixels, the corrected shot region specifying unit 236 generates a corrected shot indicating a different body part or spacing from the body part or spacing of the main subject indicated by the base shot. The size of the corrected shot region specified in accordance with the corrected shot is different from that of the base shot region. As a result, the shortage in the number of pixels can be avoided. Hereinafter, an example of avoiding the shortage in the number of pixels will be described with reference to FIGS. 18A and 18B.

FIGS. 18A and 18B are an explanatory diagram illustrating an example of avoiding a shortage in the number of pixels. In an example illustrated in FIG. 18A, a base shot indicates a face and a chest as body parts of a subject and a base shot region 85 includes a bust shot of the subject m1 which is the main subject. However, the size of the base shot region 85 with respect to the UHD captured image is small and the number of pixels of the base shot region 85 is less than a threshold.

Accordingly, the corrected shot region specifying unit 236 may generate a corrected shot indicating more body parts than the body parts indicated by the base shot. For example, the corrected shot region specifying unit 236 may generate a corrected shot indicating the whole body. In this case, the corrected shot region specifying unit 236 can specify a corrected shot region 86 including a full shot of the main subject m1, as illustrated in FIG. 18B, in accordance with the corrected shot. Since the number of pixels of the corrected shot region 86 is greater than the number of pixels of the base shot region 85 and the threshold, it is possible to guarantee a sufficient resolution.

(2-4. Continuous Evaluation of Shot)

When a shot selected by the shot selection unit 244 is changed for each frame image, a composition frame set by the composition frame setting unit 248 is not stabilized. Therefore, when the shot selection unit 244 selects a base shot or a corrected shot, the evaluation unit 240 continues to evaluate quality of a shot region in accordance with the selected shot. Then, the shot selection unit 244 maintains the selection of the shot until the shot region in accordance with the selected shot does not satisfy the quality condition. The shot selection unit 244 selects the base shot or a corrected shot newly generated by the corrected shot region specifying unit 236 after the shot region does not satisfy the quality condition. Hereinafter, a specific example of continuous evaluation of the shot will be described with reference to FIGS. 19A, 19B, 19C, and 19D.

Figure 19A:
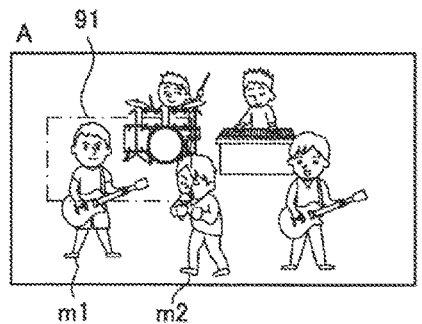
FIGS. 19A, 19B, 19C, 19D, and 19E are an explanatory diagram illustrating a specific example of a continuous evaluation of a shot.
Figure 19B:
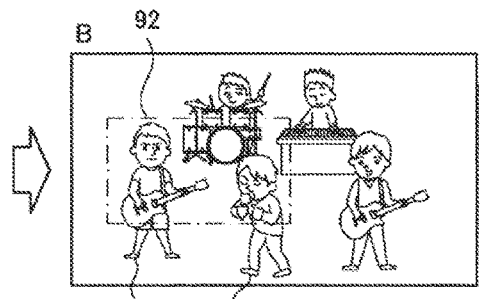
Figure 19C:
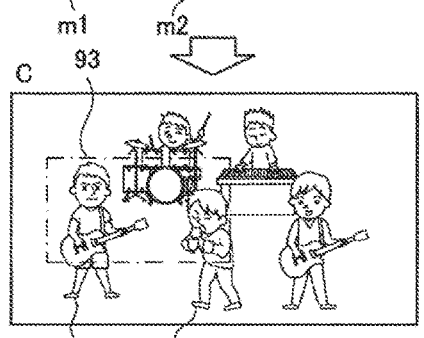

FIGS. 19A, 19B, 19C, and 19D are an explanatory diagram illustrating a specific example of a continuous evaluation of a shot. In an example illustrated in FIG. 19A, since the base shot region 91 does not satisfy the condition regarding partial cutting out, the shot selection unit 244 selects a corrected shot for a corrected shot region 92 including the subject m2 so that the condition regarding partial cutting out is satisfied, as illustrated in FIG. 19B. Thereafter, the shot selection unit 244 maintains the selection of the corrected shot and the evaluation unit 240 continues to evaluate a corrected shot region 93 and the like illustrated in FIG. 19C.

Figure 19D:
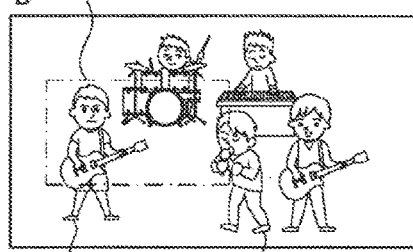
Figure 19E:
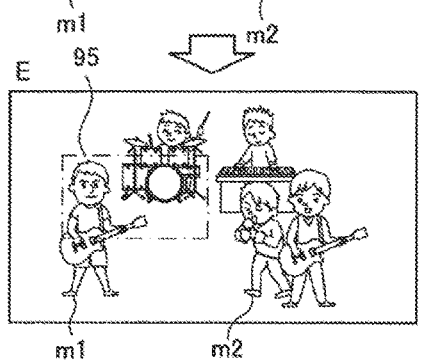

As illustrated in FIG. 19D, when a corrected shot region 94 does not satisfy the condition regarding partial cutting out due to partial cutting out of the subject m2, the shot selection unit 244 reselects the shot. Specifically, when the base shot region specified by the base shot region specifying unit 232 satisfies the condition regarding partial cutting out, the shot selection unit 244 selects the base shot. When a new corrected shot region specified by the corrected shot region specifying unit 236 satisfies the condition regarding partial cutting out, a new corrected shot is selected. In FIG. 10E, the shot selection unit 244 selects a base shot and a base shot region 95 satisfying the condition regarding partial cutting out is illustrated.

In this configuration, it is possible to achieve stabilization of the shot and maintain the shot region with high quality.

(2-5. When Recognition Result is not Obtained)

A main subject indicated by a base shot cannot be recognized through a recognition process for the UHD captured image by the image recognition unit 228 in some cases. When the main subject has not been recognized in a state in which the shot selection unit 244 does not select a shot, the composition frame setting unit 248 sets a composition frame at the position of a processing frame at the time of registration of the base shot. On the other hand, when the main subject has not been recognized in a state in which the shot selection unit 244 maintains the selection of the shot, a composition frame set in the nearest frame image is maintained. Therefore, when the main subject is recognized, the composition frame setting unit 248 smoothly moves the position of the composition frame so that the main subject is included in the composition frame. Hereinafter, a specific example of setting of the composition frame when a recognition result is not obtained will be described with reference to FIGS. 20A and 20B.

Figure 20A:
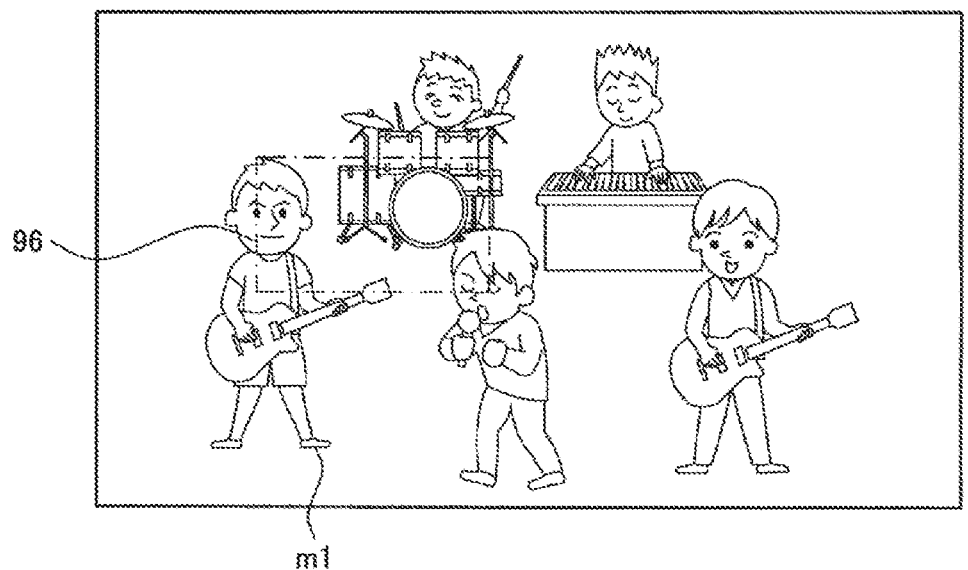
FIGS. 20A and 20B are an explanatory diagram illustrating a specific example of setting of a composition frame when a recognition result is not obtained.
Figure 20B:
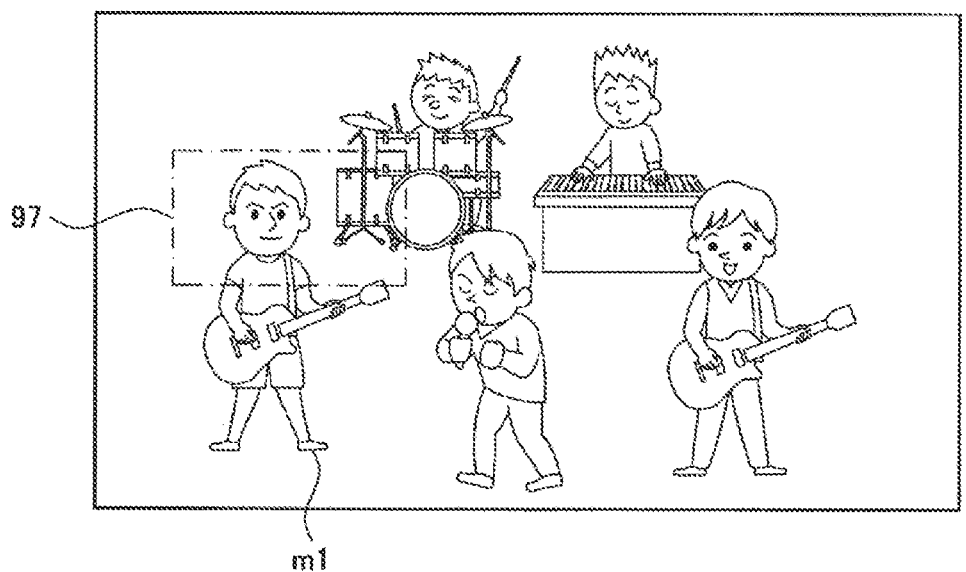

FIGS. 20A and 20B are an explanatory diagram illustrating a specific example of setting of a composition frame when a recognition result is not obtained. In the frame image illustrated in FIG. 20A, the main subject m1 indicated by the base shot has not been recognized and the composition frame setting unit 248 sets a composition frame 96 at the position of the processing frame at the time of registration of the base shot. Thereafter, when the position of the composition frame 96 is maintained until the recognition of the main subject m1 and the main subject m1 has been recognized, the composition frame setting unit 248 smoothly moves the composition frame toward the composition frame 97 including the main subject m1 in accordance with the base shot or the corrected shot, as illustrated in FIG. 20B.

In this configuration, even when frame images in which a main subject is recognized and frame images in which the main subject is not recognized exist together, it is possible to realize natural cropping across the frame images.

3. OPERATION OF SWITCHER

The configuration related to the cropping process in the switcher 20 according to the embodiment of the present disclosure has been described above. Next, an operation of the switcher 20 according to the embodiment of the present disclosure will be described.

(3-1. Registration Operation for Base Shot)

FIG. 21 is a flowchart illustrating a base shot registration operation. As illustrated in FIG. 21, in a method in which a processing frame is not manually designated (S304/No), the base shot registration unit 220 performs a recognition process for a UHD captured image (S308). Then, the base shot registration unit 220 automatically generates candidates for the processing frame based on a recognition result (S312). Thereafter, the user selects the processing frame (S316). When the selection is confirmed (S320/Yes), the user designates the camera work (S344). Then, the base shot registration unit 220 registers the main subject included in the processing fame selected by the user, a relative position and size (spacing) of the processing frame with respect to a body part of the main subject included in the processing frame, the body part of the subject included in the processing frame, and the base shot indicating the camera work designated by the user in the base shot storage unit 224 (S348).

On the other hand, in a method of manually designating the processing frame and the subject (S304/Yes, S324/Yes), the user designates a subject and a body part in the UHD captured image (S328) and the user further designates the processing frame (S332). When the user designates the camera work (S344), the base shot registration unit 220 registers the main subject designated selected by the user, a body part, a relative position and size of the processing frame with respect to the body part, and the base shot indicating the camera work designated by the user in the base shot storage unit 224 (S348).

In a method of designating the processing frame manually (S304/Yes) and not designating the subject manually (S324/No), when the user designates the processing frame (S336), the base shot registration unit 220 specifies a subject closest to the center of gravity of the processing frame as a main subject and specifies a body part of the main subject included in the processing frame (S340). When the user designates the camera work (S344), the base shot registration unit 220 registers the specified main subject, the relative position and size (spacing) of the processing frame with respect to the specified body part, the specified body part, and the base shot indicating the camera work designated by the user in the base shot storage unit 224 (S348).

(3-2. Cropping Operation)

FIG. 22 is a flowchart illustrating a cropping operation. First, the image recognition unit 228 performs image recognition for the UHD captured image input from the UHD imaging device 10 and performs detection, following, and the like of a subject (S404). Then, the base shot region specifying unit 232 specifies the base shot region from the UHD captured image in accordance with the base shot stored in the base shot storage unit 224 and using a recognition result from the image recognition unit 228 (S408). Subsequently, the corrected shot region specifying unit 236 corrects the base shot stored in the base shot storage unit 224, generates a corrected shot, and specifies the corrected shot region form the UHD captured image in accordance with the corrected shot (S412).

Then, the evaluation unit 240 evaluates whether the base shot region specified by the base shot region specifying unit 232 satisfies the quality condition, and the shot selection unit 244 selects the base shot or the corrected shot generated by the corrected shot region specifying unit 236 based on an evaluation result from the evaluation unit 240 (S416).

Subsequently, the composition frame setting unit 248 sets the composition frame in the UHD captured image based on the shot selected by the shot selection unit 244 (S420). Then, the camera work setting unit 252 sets the camera work indicated by the shot selected by the shot selection unit 244 in the composition frame set by the composition frame setting unit 248 (S424). Further, the cropping unit 256 crops the HD image included in the composition frame to which the camera work is applied (S428).

Thereafter, until the input of the UHD captured image from the UHD imaging device 10 ends (S432), the switcher 20 performs a loop process to be described with reference to FIG. 23 (S500).

Figure 23:
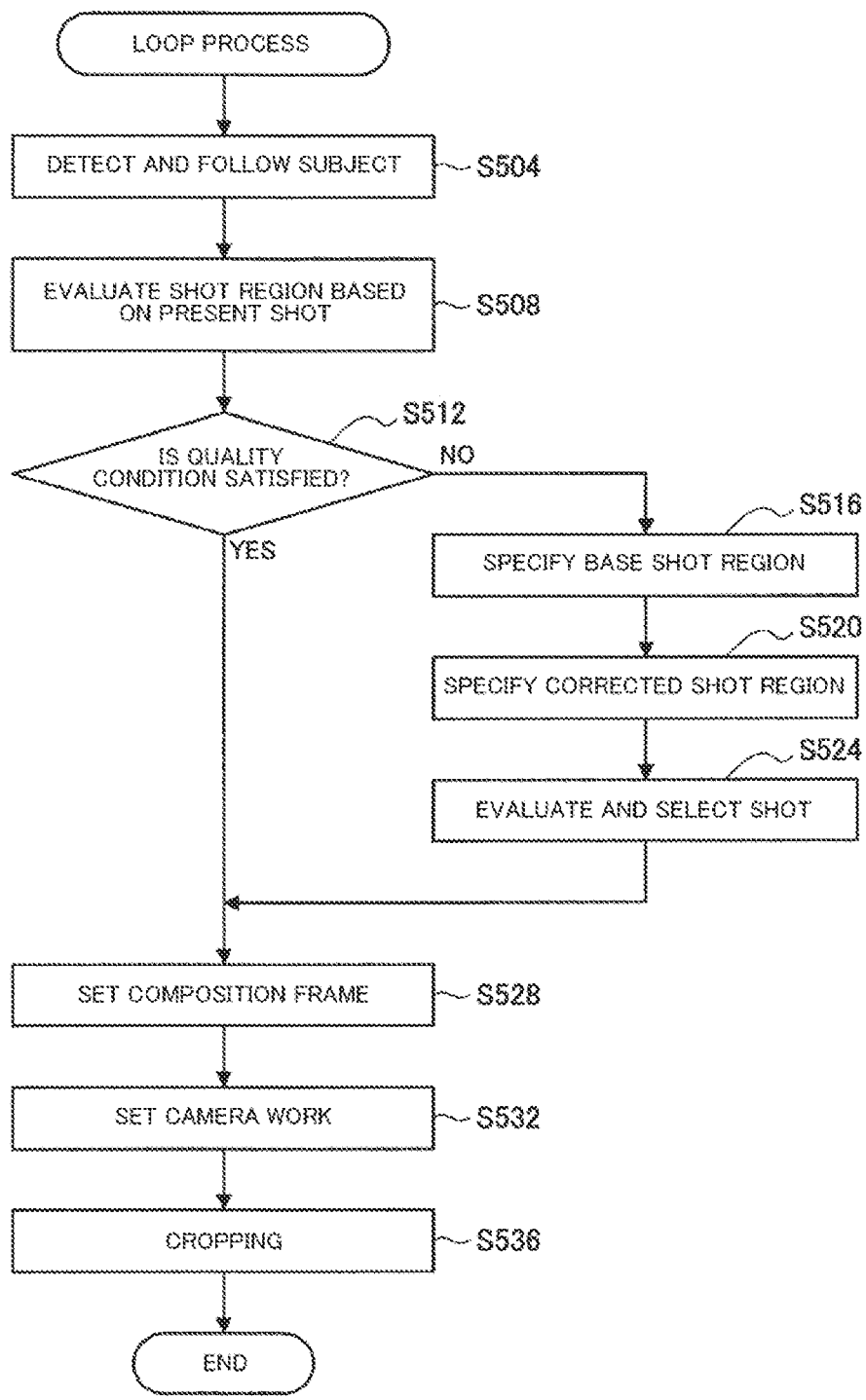

FIG. 23 is a flowchart illustrating a loop process. First, the image recognition unit 228 performs image recognition for the UHD captured images sequentially input from the UHD imaging device 10 and performs detection, following, and the like of a subject (S504). Then, the evaluation unit 240 evaluates whether the shot region based on the shot selected by the shot selection unit 244 satisfies the quality condition (S508).

When the shot region satisfies the quality condition (S512/Yes), the composition frame setting unit 248 sets the composition frame based on the shot selected by the shot selection unit 244 (S528). Then, the camera work setting unit 252 sets the camera work indicated by the shot selected by the shot selection unit 244 in the composition frame set by the composition frame setting unit 248 (S532). Further, the cropping unit 256 crops the HD image included in the composition frame to which the camera work is applied (S536).

Conversely, when the shot region does not satisfy the quality condition (S512/No), the base shot region specifying unit 232 specifies the base shot region from the UHD captured image in accordance with the base shot stored in the base shot storage unit 224 (S516). The corrected shot region specifying unit 236 corrects the base shot stored in the base shot storage unit 224, generates a corrected shot, and specifies the corrected shot region from the UHD captured image in accordance with the corrected shot (S520). Then, the evaluation unit 240 evaluates whether the base shot region specified by the base shot region specifying unit 232 satisfies the quality condition, and the shot selection unit 244 selects the base shot or the corrected shot generated by the corrected shot region specifying unit 236 based on an evaluation result from the evaluation unit 240 (S524). Thereafter, the above-described processes of S528 to S536 are performed.

4. CONCLUSION

As described above, according to the embodiment of the present disclosure, it is possible to automatically set a suitable composition frame so that a subject is followed. Further, by selecting a shot used to set the composition frame in accordance with quality of a shot region specified in accordance with each shot, it is possible to maintain the quality of the composition frame. For example, according to the embodiment of the present disclosure, it is possible to set the suitable composition frame from the viewpoint such as partial cutting out, a composition balance, or the number of pixels. That is, according to the embodiment of the present disclosure, it is possible to considerably reduce an effort of the user setting the suitable composition frame and it is possible to set the suitable composition frame in accordance with a motion of a subject even when the subject is moving.

The embodiment of the present disclosure has been described. Hereinafter, several modification examples of the embodiment of the present disclosure will be described. Each modification example to be described below may be applied to the embodiment of the present disclosure singly or may be applied to the embodiment of the present disclosure in combination. Each modification example may be applied instead of the configuration described in the embodiment of the present disclosure or may be applied additionally to the configuration described in the embodiment of the present disclosure.

For example, each step in the process of the switcher 20 according to the present specification may not necessarily be processed chronologically in the order described in the sequence figures or the flowcharts. For example, each step in the process of the switcher 20 may be processed in a different order from the order described in the flowchart or may be processed in parallel.

A computer program for realizing the same functions as the configurations of the above-described switcher 20 may be generated in hardware such as a CPU, a ROM, and a RAM embedded in the switcher 20. A storage medium that stores the computer program is also provided.

The advantageous effects described in the present specification are merely explanatory or exemplary and are not limited. That is, in the technology according to the present disclosure, other advantageous effects apparent to those skilled in the art from the description of the present specification can be obtained in addition to or instead of the foregoing advantageous effects.

The following configurations belong to the technical scope of the present disclosure.

(1)

An image processing device including:

an evaluation unit configured to evaluate whether a first region of a captured image satisfies a quality condition; and a composition frame setting unit configured to set a different composition frame in the captured image in accordance with an evaluation result of the first region.

(2)

The image processing device described in (1), further including:

a first region specifying unit configured to specify the first region in accordance with a first rule;

a second region specifying unit configured to specify a second region of the captured image in accordance with a second rule; and a rule selection unit configured to select the first or second rule based on whether the first region satisfies the quality condition, in which the composition frame setting unit sets the composition frame based on the rule selected by the rule selection unit.

(3)

The image processing device described in (2), in which each rule including the first and second rules relates to a main subject which ought to be included in a region to be specified, and the evaluation unit evaluates whether the region specified in accordance with each of the rules satisfies the quality condition taking into account presence of another subject in the region.

(4)

The image processing device described in (3), in which the quality condition includes a condition regarding whether the other subject is partially cut out, and, based on a degree that the other subject is partially cut out, the evaluation unit evaluates whether the region satisfies the condition regarding whether the other subject is partially cut out.

(5)

The image processing device described in (4), in which, based on a face of the other subject which is included in the region and a range of the face included in the region which is less than a predetermined proportion of the entire face, the evaluation unit evaluates that the region does not satisfy the condition regarding whether the other subject is partially cut out.

(6)

The image processing device described in (4) or (5), in which, when a size of the other subject in the region is less than a predetermined proportion of a size of the main subject in the region, the evaluation unit evaluates that the region satisfies the condition regarding whether the other subject is partially cut out independently of that the other subject is partially cut out.

(7)

The image processing device described in any one of (4) to (6), in which, when the first region does not satisfy the condition regarding whether the other subject is partially cut out, the second region specifying unit specifies a region including the other subject and satisfying the condition regarding whether the other subject is partially cut out, as the second region.

(8)

The image processing device described in any one of (4) to (6), in which, when the first region does not satisfy the condition regarding whether the other subject is partially cut out, the second region specifying unit specifies a region which does not include the other subject as the second region.

(9)

The image processing device described in (7) or (8), in which each of the rules relates to a body part of the main subject which ought to be included in the region, and the second region specifying unit sets a rule indicating a different body part from a body part indicated by the first rule as the second rule and specifies the second region in accordance with the second rule.

(10)

The image processing device described in (7) or (8), in which each of the rules relates to a size of a margin of the main subject in a horizontal direction or a vertical direction, and the second region specifying unit sets a rule indicating a different margin from the margin indicated by the first rule as the second rule and specifies the second region in accordance with the second rule.

(11)

The image processing device described in any one of (3) to (10), in which each of the rules relates to a size of a margin of the main subject in a horizontal direction or a vertical direction, the quality condition includes a condition regarding a bias of a margin of the main subject and the other subject in the region in the horizontal direction or the vertical direction, and the evaluation unit evaluates that a region in which there is a bias in the margin of the main subject and the other subject in the horizontal direction or the vertical direction does not satisfy the condition regarding the bias of the margin.

(12)

The image processing device described in (11), in which, when there is the bias in the margin of the main subject and the other subject in the first region in the horizontal direction or the vertical direction, the second region specifying unit specifies a region in which the bias is reduced as the second region.

(13)

The image processing device described in any one of (3) to (8), in which the quality condition includes a condition regarding the number of pixels of the region, and the evaluation unit evaluates that a region in which the number of pixels is less than a threshold does not satisfy the condition regarding the number of pixels.

(14)

The image processing device described in (13), in which each of the rules relates to a body part of the main subject which ought to be included in the region, and, when the number of pixels of the first region is less than a threshold, the second region specifying unit specifies a region in which the number of pixels is greater than the threshold, as the second region.

(15)

The image processing device described in any one of (2) to (14), in which the captured image is a moving image, and the rule selection unit selects the second rule when the first region does not satisfy the quality condition and the second region satisfies the quality condition with regard to one frame image included in the moving image, maintains the selection of the second rule until the second region specified in accordance with the second rule does not satisfy the quality condition with regard to a frame image subsequent to the one frame image, and selects the first rule or a new second rule after the second region does not satisfy the quality condition.

(16)

The image processing device described in (15), in which the composition frame setting unit maintains a composition frame set in a nearest frame image in a frame image in which the main subject is not recognized from the captured image.

(17)

The image processing device described in any one of (1) to (16), further including a cutting unit configured to cut an image included in the composition frame set by the composition frame setting unit from the captured image.

(18)

The image processing device described in any one of (1) to (17), in which processing in each configuration in which the evaluation unit and the composition frame setting unit are included is performed with regard to each of a plurality of the first regions included in the captured image to set a plurality of composition frames in the captured image.

(19)

A program causing a computer to function as:

an evaluation unit configured to evaluate whether a first region of a captured image satisfies a quality condition; and a composition frame setting unit configured to set a different composition frame in the captured image in accordance with an evaluation result of the first region.

(20)

An image processing method including:

evaluating whether a first region of a captured image satisfies a quality condition by a processor; and setting a different composition frame in the captured image in accordance with an evaluation result of the first region.

REFERENCE SIGNS LIST

10 UDH imaging device
20 Switcher
30 Operation terminal
211 Terminal group
212 Sound operation unit
214 Image selection unit
215 Base shot selection unit
216 Output image switching unit
220 Base shot registration unit
224 Base shot storage unit
228 Image recognition unit
232 Base shot region specifying unit
236 Corrected shot region specifying unit
240 Evaluation unit
244 Shot selection unit
248 Composition frame setting unit
252 Camera work setting unit
256 Cropping unit

The invention claimed is:

1. An image processing device, comprising:
a first region specifying unit configured to specify a first region of a captured image based on a first rule, wherein
the first rule relates to a main subject, and
the first region includes the main subject;
an evaluation unit configured to evaluate, based on a size of a subject different from the main subject in each region is less than a threshold proportion of a size of the main subject in a corresponding region, whether the corresponding region of the captured image satisfies a quality condition, wherein the quality condition includes a condition regarding whether the subject different from the main subject is partially cut out; and
a composition frame setting unit configured to set a composition frame in the captured image based on an evaluation result of the first region.

2. The image processing device according to claim 1, further comprising
a second region specifying unit configured to specify a second region of the captured image in accordance with a second rule; and
a rule selection unit configured to select one of the first rule or the second rule based on whether the first region satisfies the quality condition, wherein the composition frame setting unit is further configured to set the composition frame based on the selected one of the first rule or the second rule.

3. The image processing device according to claim 2, wherein
each rule of the first rule and the second rule relates to the main subject,
the second region includes the main subject, and
the evaluation unit is further configured to evaluate whether each region of the first region and the second region satisfies the quality condition taking into account presence of the subject different from the main subject in the corresponding region.

4. The image processing device according to claim 3, wherein
based on a degree that the subject different from the main subject is partially cut out, the evaluation unit is further configured to evaluate whether each region satisfies the condition that the subject different from the main subject is partially cut out.

5. The image processing device according to claim 4, wherein
based on a face of the subject different from the main subject and a range of the face included in each region, the evaluation unit is further configured to evaluate that the corresponding region does not satisfy the condition regarding whether the subject different from the main subject is partially cut out, and
the range of the face is less than a threshold proportion of the face of the subject different from the main subject.

6. The image processing device according to claim 4, wherein
based on the first region does not satisfy the condition regarding whether the subject different from the main subject is partially cut out, the second region specifying unit is further configured to specify, as the second region, a region including the subject different from the main subject and satisfying the condition regarding whether the subject different from the main subject is partially cut out.

7. The image processing device according to claim 4, wherein
based on the first region does not satisfy the condition regarding whether the subject different from the main subject is partially cut out, the second region specifying unit is further configured to specify, as the second region, a region which does not include the subject different from the main subject.

8. The image processing device according to claim 6, wherein
the second region specifying unit is further configured to:
set, as the second rule, a rule indicating a body part different from a body part indicated by the first rule; and
specify the second region based on the second rule.

9. The image processing device according to claim 6, wherein
each of the first rule and the second rule relates to a size of a margin of the main subject in one of a horizontal direction or a vertical direction, and
the second region specifying unit is further configured to:
set, as the second rule, a rule indicating a margin different from a margin indicated by the first rule; and
specify the second region based on the second rule.

10. The image processing device according to claim 3, wherein
each of the first rule and the second rule relates to a size of a margin of the main subject in one of a horizontal direction or a vertical direction,
the quality condition further includes a condition regarding a bias of the margin of the main subject and the subject different from the main subject in each region in one of the horizontal direction or the vertical direction, and
the evaluation unit is further configured to evaluate that a region of the first region and the second region in which a bias is present in the margin of the main subject and the subject different from the main subject in one of the horizontal direction or the vertical direction does not satisfy the condition regarding the bias of the margin.

11. The image processing device according to claim 10, wherein
based on the bias in the margin of the main subject and the subject different from the main subject in the first region in one of the horizontal direction or the vertical direction, the second region specifying unit is further configured to specify, as the second region, a region in which the bias is reduced.

12. The image processing device according to claim 3, wherein
the quality condition further includes a condition regarding a number of pixels of each region, and
the evaluation unit is further configured to evaluate that a region of the first region and the second region in which the number of pixels is less than a first threshold number of pixels does not satisfy the condition regarding the number of pixels.

13. The image processing device according to claim 12, wherein
based on the number of pixels of the first region is less than a second threshold number of pixels, the second region specifying unit is further configured to specify a region of the first region and the second region in which the number of pixels is greater than the second threshold number of pixels, as the second region.

14. The image processing device according to claim 2, wherein
the captured image is a moving image,
the rule selection unit is further configured to:
select the second rule based on the first region does not satisfy the quality condition and the second region satisfies the quality condition with regard to a first frame image included in the moving image;
maintain the selection of the second rule until the second region does not satisfy the quality condition with regard to a second frame image subsequent to the first frame image; and
select the first rule or a third rule after the second region does not satisfy the quality condition.

15. The image processing device according to claim 14, wherein the composition frame setting unit is further configured to maintain the set composition frame in a nearest frame image to a frame image in which the main subject is not recognized from the captured image.

16. The image processing device according to claim 1, further comprising
a cutting unit configured to cut an image included in the set composition frame.

17. The image processing device according to claim 1, wherein
the captured image includes a plurality of regions, and
the composition frame setting unit is further configured to set a plurality of composition frames in the captured image.

18. A non-transitory computer-readable medium having stored thereon, computer-executable instructions which, when executed by a computer, cause the computer to execute operations, the operations comprising:

specifying a first region of a captured image based on a first rule, wherein
the first rule relates to a main subject, and
the first region includes the main subject;

evaluating, based on a size of a subject different from the main subject in each region is less than a threshold proportion of a size of the main subject in a corresponding region, whether the corresponding region of the captured image satisfies a quality condition, wherein the quality condition includes a condition regarding whether the subject different from the main subject is partially cut out; and setting a composition frame in the captured image based on an evaluation result of the first region.

19. An image processing method, comprising:

a first region specifying unit configured to specify a first region of a captured image based on a first rule, wherein
the first rule relates to a main subject, and
the first region includes the main subject;

evaluating, based on a size of a subject different from the main subject in each region is less than a threshold proportion of a size of the main subject in a corresponding region, whether the corresponding region of the captured image satisfies a quality condition, wherein the quality condition includes a condition regarding whether the subject different from the main subject is partially cut out; and setting a composition frame in the captured image based on an evaluation result of the first region.

\* \* \* \* \*